(12) United States Patent
Kamada et al.

(10) Patent No.: US 7,670,258 B2
(45) Date of Patent: Mar. 2, 2010

(54) CONTROL DEVICE FOR VEHICLE DRIVE APPARATUS

(75) Inventors: Atsushi Kamada, Toyota (JP); Atsushi Tabata, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 418 days.

(21) Appl. No.: 11/764,014

(22) Filed: Jun. 15, 2007

(65) Prior Publication Data

US 2007/0293362 A1 Dec. 20, 2007

Related U.S. Application Data

(60) Provisional application No. 60/813,698, filed on Jun. 15, 2006.

(51) Int. Cl.
*B60W 20/00* (2006.01)
(52) U.S. Cl. .................. 477/77; 475/5; 477/5; 903/930
(58) Field of Classification Search .................. 475/84, 475/132; 477/6, 83, 90
See application file for complete search history.

(56) References Cited

U.S. PATENT DOCUMENTS

| 6,953,409 | B2 | 10/2005 | Schmidt et al. | |
|---|---|---|---|---|
| 2005/0204537 | A1 | 9/2005 | Reed et al. | |
| 2005/0204861 | A1 | 9/2005 | Reed et al. | |
| 2005/0204862 | A1 | 9/2005 | Reed et al. | |
| 2005/0205335 | A1 | 9/2005 | Reed et al. | |
| 2005/0205373 | A1 | 9/2005 | Foster et al. | |
| 2006/0027413 | A1* | 2/2006 | Tabata et al. | 180/305 |
| 2007/0284161 | A1* | 12/2007 | Ohno | 180/65.2 |

FOREIGN PATENT DOCUMENTS

| JP | 9-322308 | 12/1997 |
|---|---|---|
| JP | 11-217025 | 8/1999 |
| JP | 2000-6676 | 1/2000 |
| JP | 2000-209706 | 7/2000 |
| JP | 3129204 | 11/2000 |
| JP | 2003-127679 | 5/2003 |
| JP | 2004-42834 | 2/2004 |
| JP | 2006-62569 | 3/2006 |
| JP | 2006-132453 | 5/2006 |

* cited by examiner

*Primary Examiner*—Sherry L Estremsky
*Assistant Examiner*—Edwin A. Young
(74) *Attorney, Agent, or Firm*—Oblon, Spivak, McClelland, Maier & Neustadt, L.L.P.

(57) ABSTRACT

A control device is provided for a vehicle drive apparatus, which includes a differential mechanism distributing an output of an engine to a first electric motor and an output shaft, and an electric motor provided on the output shaft, for miniaturizing the drive apparatus and/or providing improved fuel economy while preventing switching shocks from occurring in starting or stopping the engine. A switching clutch C0 or switching brake B0 is provided for placing a shifting mechanism 10 in a continuously variable shifting state and a step-variable shifting state, enabling the vehicle drive apparatus to have combined advantages including a fuel economy improving effect of a transmission, enabled to electrically change a speed ratio, and a high transmitting efficiency of a gear type transmitting device enabled to mechanically transmit drive power. During the occurrence of overlapping phases between operation of switching control mean 50 for switching a shifting state and operation of engine starting and stopping control means 90 for starting or stopping the engine, execution control means 82 enables the operations to be sequentially executed so as to avoid overlapping executions, thereby suppressing the switching shocks.

14 Claims, 13 Drawing Sheets

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | TOTAL 4.76 |
| R |  |  | ○ |  |  |  | ○ | 3.209 |  |
| N |  | ○ |  |  |  |  |  |  |  |

○ ENGAGED
◎ ENGAGED IN STEP-VARIABLE, RELEASED IN CONTINUOUSLY-VARIABLE

|     | C0 | C1 | C2 | B0 | B1 | B2 | SPEED RATIO | STEPPING RATIO |
|-----|----|----|----|----|----|----|-------------|----------------|
| 1st | ◎ | ○ |    |    |    | ○ | 2.804 | 1.54 |
| 2nd | ◎ | ○ |    |    | ○ |    | 1.531 | 1.53 |
| 3rd | ◎ | ○ | ○ |    |    |    | 1.000 | 1.42 |
| 4th |    | ○ | ○ | ◎ |    |    | 0.705 | TOTAL 3.977 |
| R   |    |    | ○ |    |    | ○ | 2.393 | |
| N   | ○ |    |    |    |    |    |       | |

○ ENGAGED
◎ ENGAGED IN STEP-VARIABLE,
　RELEASED IN CONTINUOUSLY-VARIABLE

CONTROL DEVICE FOR VEHICLE DRIVE APPARATUS

TECHNICAL FIELD

The present invention relates to a control device for a vehicle drive apparatus, and more particularly to a technology of a vehicle drive apparatus including a differential mechanism operative to perform a differential action, and an electric motor especially, for miniaturizing the electric motor or the like.

BACKGROUND ART

There has heretofore been known a drive apparatus of a vehicle including a differential device through which an output of a drive power source, such as an engine or the like, is distributed to a first electric motor and an output member, and a second electric motor disposed between the output member and drive wheels. Such drive apparatus for a hybrid vehicle is disclosed for example in the Patent Literature 1 (JP 2003-127697A). It includes a differential mechanism being comprised of a planetary gear unit and performing a differential action for mechanically transmitting a major part of power outputted from the engine to drive wheels. A remaining part of power from the engine is electrically transmitted from the first electric motor to the second electric motor using an electrical path. Thus, the drive apparatus operates a transmission of which shifting ratio is electrically changed, for example as an electrically controlled continuously variable automatic transmission. The drive apparatus is controlled by the control device so that the vehicle runs with the optimum operation state of the engine, thus improving fuel consumption, i.e., mileage.

DISCLOSURE OF THE INVENTION

In general, the continuously variable transmission has heretofore been known as a device for improving fuel consumption of a vehicle. A gear type power-transmitting device such as a step-variable automatic transmission has heretofore been known as a device having high transmitting efficiency. However, no power transmitting mechanism having such combined advantages has been put into practical use yet. For instance, the hybrid vehicle drive apparatus, disclosed in Patent Publication 1, includes the electrical path through which electric energy is transmitted from the first electric motor to the second electric motor, that is, a transmitting path through which a part of the vehicle drive force is transmitted in the form of electric energy. This inevitably causes the first electric motor to increase in size with an increase in an output of the engine. Also, the second electric motor, driven with electric energy output from the first electric motor, is caused to increase in size. Thus, an issue arises with the occurrence of an increase in size of the drive apparatus.

In addition, a part of the engine output is converted to electric energy and the rest of the engine output is transmitted to the drive wheels. Thus, there is a probability of deterioration occurring in fuel consumption of the vehicle due to certain running conditions of the vehicle such as the running of the vehicle at a high speed. The power distributing mechanism is used as the shifting mechanism with which the speed ratio is electrically shifted, that is, the continuously variable transmission referred to as, for instance, an electrical CVT, encountering a similar issue.

Meanwhile, the hybrid vehicle drive apparatus may be set such that the electric motor and the engine are operative as individual drive power sources or a combined drive power source, depending on the running conditions of the vehicle such as a halt of the vehicle, a running of the vehicle under low loads and a running of the vehicle under accelerated conditions. Under such situations, the engine is repeatedly started or stopped depending on the running states of the vehicle. In general, with the engine torque fluctuating like states in start-up or halt of the engine, switching shocks need to be minimized as less as possible.

Thus, even with the vehicle drive apparatus adapted to address the issues of the hybrid vehicle drive apparatus, there is a need for providing a control device which can suppress the occurrence of switching shocks during the start-up or halt of the engine.

The present invention has been completed in view of the above mentioned circumstances, and has an object to provide a control device for a vehicle drive apparatus having a differential mechanism operative to perform a differential action in which an engine output is distributed to a first electric motor and an output shaft, and an electric motor disposed in a power transmitting path between the differential mechanism and drive wheels. The control device can minimize the drive apparatus or improve fuel consumption while enabling the suppression of switching shocks during a start-up or halt of the engine.

The invention recited in the claim 1 is featured by a control device for vehicle drive apparatus having an engine, a continuously variable transmission including a differential mechanism, through which an output of the engine is distributed to a first electric motor and a transmitting member, and a second electric motor disposed in a power transmitting path between the transmitting member and drive wheels to be operative as an electrically controlled continuously variable transmission, and au automatic transmission forming a part of the power transmitting path and functioning as a shifting mechanism.

The control device comprises (i) a differential state switching device provided in the differential mechanism and operative to be selectively switched to an uncoupling state to place the continuously variable transmission in a continuously variable shifting state to render the continuously variable transmission operative as an electrically controlled variable transmission, and to a coupling state to place the continuously variable transmission in a step-variable shifting state to render the continuously variable transmission inoperative as the electrically controlled variable transmission; (ii) switching control means operative to switch the differential state switching device based on a vehicle condition for selectively switching a shifting state of the continuously variable transmission into the continuously variable shifting state and the step-variable shifting state; (iii) engine starting and stopping control means for executing starting and stopping of the engine; and (iv) execution control means for executing either one of the switching of the shifting state and the starting or the stopping of the engine when overlapping phases occur between an operation of the switching control means for switching the shifting state and an operation of the engine starting and stopping control means for executing the starting or the stopping of the engine.

With such a structure, the differential state switching device allows the continuously variable transmission inside the vehicle drive apparatus to be selectively placed in the continuously variable shifting state, enabling an electrically controlled continuously variable shifting action to be performed, and the step-variable shifting state in which the electrically controlled continuously variable shifting action is disenabled. Thus, the drive apparatus can have both advantages including improved fuel consumption achieved by the transmission, enabled to electrically control a speed ratio, and increased power transmitting efficiency provided by the gear-type transmitting device enabled to mechanically transmit drive power.

For instance, in a normal output region of the engine where the vehicle runs at a low/medium speed and low/medium output, placing the continuously variable transmission in the continuously variable shifting state ensures the vehicle to have fuel economy performance. During the vehicle running of the vehicle at the high speed, if the continuously variable transmission is placed in the step-variable shifting state, the engine output is mainly transmitted through a mechanical transmitting path to the drive wheels. This suppresses a loss in conversion between drive power and electric energy occurring when the transmission is rendered operative to electrically shift the speed ratio, resulting in an improved fuel consumption.

Further, for instance, as the continuously variable transmission is placed in the step-variable shifting state in the high output region of the engine, the transmission is rendered operative to electrically shift the speed ratio in regions where the vehicle runs at the low/medium speed and low/medium output. This minimizes a maximal value of electric energy to be generated by the electric motor, that is, a maximal value of electric energy to be transmitted through the electric motor. This results in a further miniaturization of the electric motor or the vehicle drive apparatus including the electric motor.

Furthermore, with the vehicle drive apparatus including the continuously variable transmission formed in a structure that is placed in the continuously variable shifting state and the step-variable shifting state, overlapping phases occur between the operation of the switching control means operative to perform the switching of the shifting state for selectively placing the continuously variable transmission in the continuously variable shifting state and the step-variable shifting state, and the operation of the engine starting and stopping control means for effectuating the starting or the stopping of the engine. When this takes place, the execution control means executes either one of the switching of the shifting state and the starting or the stopping of the engine. This reliably prevents the overlapping operations from being executed to simultaneously perform the switching of the shifting state and the starting or the stopping of the engine, thereby suppressing the occurrence of switching shocks.

For instance, if the overlapping operations are executed for the switching of the shifting state and the starting or the stopping of the engine, fluctuations take place in engine torque during the start-up or halt of the engine. This adversely affects the operation of the switching control means with the resultant degradation in switching controllability on the shifting state, causing the switching shocks to occur. However, the execution control means avoids the overlapping operations from being executed for the switching of the shifting state and the starting or the stopping of the engine, thereby suppressing the occurrence of switching shocks.

The invention recited in the claim 2 is featured by the execution control means that executes the starting or the stopping of the engine in advance, and subsequently, executes the switching of the shifting state. This avoids the execution control means from executing the overlapping operations for the switching of the shifting state and the starting or the stopping of the engine. In addition, the individual operations are independently executed, resulting in the suppression of switching shocks. Moreover, as the starting of the engine is executed in advance, the required drive torque can be rapidly satisfied, improving accelerating performance.

The invention recited in the claims 3, 4 is further featured by the shift control means that performs the gear shifting in the automatic transmission. If the overlapping operations occur among the switching of the shifting state, the starting or the stopping of the engine, and in addition thereto, the gear shifting of the automatic transmission, the execution control means executes either one of the switching of the shifting state, the starting or the stopping of the engine and the gear shifting of the automatic transmission. This suppresses the occurrence of switching shocks resulting from the overlapping operations executed for the switching of the shifting state, the starting or the stopping of the engine and the gear shifting of the automatic transmission.

For instance, if the overlapping operations executed for the switching of the shifting state, the starting or the stopping of the engine and the gear shifting of the automatic transmission, fluctuations take place in input torque to be delivered to the automatic transmission due to the switching of the shifting state and the starting or the stopping of the engine. This adversely affects the shift control means with degraded control of the automatic transmission, which consequently performs the gear shifting in complicated operation. However, the execution control means avoids the overlapping operations from being executed for the switching of the shifting state, the starting or the stopping of the engine and the gear shifting of the automatic transmission, thereby suppressing switching shocks.

The invention recited in the claim 5, 6, 7, 8 is featured by the execution control means that alters the executing sequence based on the vehicle condition. With such arrangement, the execution control means avoids the overlapping operations from being executed at least for the switching of the shifting state and the starting or the stopping of the engine. This enables the individual controls to be independently performed with the resultant suppression of switching shocks.

The invention recited in the claim 9 is featured by a control device for vehicle drive apparatus having an engine, and a differential portion including a differential mechanism for distributing an output of the engine to a first electric motor and a transmitting member, and a second electric motor disposed in a power transmitting path between the transmitting member and drive wheels.

The control device comprises (i) a differential state switching device provided in the differential mechanism for selectively switching the differential mechanism in a differential state for a differential action and a locked state interrupting the differential action; (ii) switching control means operative to switch the differential state switching device based on a vehicle condition for selectively switching a shifting state of the differential mechanism into the differential state and the locked state; (iii) engine starting and stopping control means for executing starting and stopping of the engine; and (iv) execution control means for executing either one of the switching of the shifting state and the starting or the stopping of the engine when overlapping phases occur between an operation of the switching control means for the switching of the shifting state and an operation of the engine starting and stopping control means for the starting or the stopping of the engine.

With such an arrangement, the differential-state switching device allows the differential mechanism to be selectively switched to the differential state for the differential action to be performed and the locked state for differential action to be disenabled. Thus, the drive apparatus can have both advantages including improved fuel consumption of the transmission enabled to electrically control the speed ratio, and increased power transmitting efficiency of the gear-type transmitting device enabled to mechanically transmit drive power. For instance, in the normal output region of the engine where the vehicle runs at the low/medium speed and low/medium output, placing the differential mechanism in the differential state allows the vehicle to ensure fuel economy performance. During the running of the vehicle at a high speed, placing the differential mechanism in the locked state allows the engine output to be transmitted mainly through the mechanical power transmitting path to the drive wheels. This suppresses a loss in conversion between drive power and electric energy occurring when the transmission is rendered operative to electrically shift the speed ratio, thereby improving fuel consumption.

Further, for instance, if the differential mechanism is placed in the locked state during the running of the vehicle at the high output region of the engine, the transmission is rendered operative to electrically shift the speed ratio in regions where the vehicle runs at the low/medium speed and low/medium output. This minimizes the maximal value of electric energy to be generated by the electric motor, that is, the maximal value of electric energy to be transmitted through the electric motor. This results in a further miniaturization of the electric motor or the vehicle drive apparatus including the electric motor.

With the vehicle drive apparatus including the differential mechanism formed in the structure that can be placed in the differential state and the locked state, the overlapping phases occur between the operation of the switching control means for selectively placing the differential mechanism in the differential state and the locked state, and the operation of the engine starting and stopping control means for performing the starting or the stopping of the engine. In this moment, the execution control means executes either one of the switching of the shifting state and the starting or the stopping of the engine. This prevents the overlapping operations from being executed to simultaneously perform the switching of the shifting state and the starting or the stopping of the engine, thereby suppressing the occurrence of switching shocks. For instance, if the overlapping operations are executed for the switching of the shifting state and the starting or the stopping of the engine, fluctuations take place in engine torque during the start-up or halt of the engine. This adversely affects the operation of the switching control means with the resultant degradation in switching controllability on the shifting state, causing the switching shocks to occur. However, the execution control means avoids the overlapping operations from being executed for the switching of the shifting state and the starting or the stopping of the engine, thereby suppressing the occurrence of switching shocks.

The invention recited in the claim 10 is featured by the execution control means that executes the starting or the stopping of the engine in advance, and thereafter, executes the switching of the shifting state. This avoids the execution control means from executing the overlapping operations for the switching of the shifting state and the starting or the stopping of the engine. In addition, the individual operations are independently executed, resulting in the suppression of switching shocks. Moreover, as the starting of the engine is executed in advance, the required drive torque can be rapidly satisfied, improving accelerating performance.

The invention recited in the claim 11, 12 is further featured by the shifting portion functioning as the shifting mechanism forming a part of the power transmitting path, and the shift control means for causing the shifting portion to execute the gear shifting. If overlapping phases occur among the switching of the shifting state and the starting or the stopping of the engine, and in addition thereto, the operation of the shift control means for performing the gear shifting of the shifting portion, the execution control means executes either one of the switching of the shifting state, the starting or the stopping of the engine and the gear shifting of the shifting portion. Such control enables the suppression of switching shocks occurring when the overlapping operations are executed for the switching of the shifting state, the starting or the stopping of the engine and the gear shifting of the shifting portion.

For instance, if the overlapping operations are executed for the switching of the shifting state, the starting or the stopping of the engine and the gear shifting of the shifting portion, fluctuations take place in input torque applied to the transmission due to the switching of the shifting state and the starting or the stopping of the engine. This adversely affects the shift control means causing the shifting portion to perform the gear shifting in complicated operation. This seems to cause switching shocks to occur. However, the execution control means avoids the overlapping operations from being executed for the switching of the shifting state, the starting or the stopping of the engine and the gear shifting of the shifting portion, thereby suppressing the occurrence of switching shocks.

The invention recited in the claim 13, 14 is featured by the execution control means that alters the executing sequence based on the vehicle condition. This avoids the execution control means from executing the overlapping operations at least for the switching of the shifting state and the starting or the stopping of the engine. In addition, individual operations are independently controlled with increased reliability, thereby suppressing the occurrence of switching shocks.

Preferably, the invention is further featured by the torque-assist control means that allows the second electric motor to execute torque-assisting during control of the execution control means. This makes it possible to allow the required output torque to be rapidly satisfied. That is, when the overlapping operations are avoided from being executed for the switching of the shifting state, the starting or the stopping of the engine and the gear shifting of the shifting portion, a shortage of torque may occur for the required output torque or the torque may be output in a delay. However, the torque-assist control means executes torque-assisting, enabling the required output torque to be rapidly satisfied.

Preferably, the differential state switching device causes the differential mechanism to be placed in the differential state enabling the differential action to be performed, causing the continuously variable transmission to be placed in the continuously variable shifting state. In contrast, the differential mechanism is placed in the locked condition disabling the differential action, causing the differential mechanism to be placed in the step-variable shifting state. Thus, the continuously variable transmission can be placed in either the continuously variable shifting state or the step-variable shifting state.

Preferably, the differential mechanism includes a first element coupled to the engine, a second element connected to the first electric motor, and a third element connected to the transmitting member. The differential state switching means operates in one mode to allow the first to third elements to rotate relative to each other for the differential mechanism to be placed in the differential state and the other mode to allow the first to third elements to rotate in a unitary fashion or to cause the second element to be brought into a nonrotating state for the differential mechanism to be placed in the locked state. Such arrangement provides a structure for the differential mechanism to be placed in either the differential state or the locked state.

Preferably, the differential state switching device includes a clutch, operative to couple at least two of the first to third elements to each other for unitary rotation of these elements, and/or a brake operative to couple the second element to the nonrotating member to lock the second element in the nonrotating state. This allows the differential mechanism to have a structure that can be simply placed in either the differential state or the locked state.

Preferably, releasing or uncoupling the clutch and the brake allows the first to third rotary elements to rotate relative to each other. This causes the differential mechanism to be placed in the differential state and act as an electrically controlled differential device. Engaging or coupling the clutch allows the differential mechanism to act as the transmission providing the speed ratio of "1". Alternatively, coupling the brake allows the differential mechanism to act as the speed-increasing transmission providing the speed ratio less than "1". This allows the differential mechanism to have a structure to be placed in either the differential state or the locked state while having the structure of the transmission that has a fixed speed ratio in a single gear position or a multiple-gear position.

Preferably, the differential mechanism is composing of a planetary gear device. The first element acts as a carrier, the second element acts as a sun gear, and the third element acts as a ring gear, respectively of the planetary gear device. This allows the differential mechanism to have a minimized axial dimension. In addition, the differential mechanism can be formed in a simplified structure with use of the single planetary gear device.

Preferably, the planetary gear device includes a single pinion type planetary gear device. Such a structure allows the differential mechanism to be minimized in an axial dimension. In addition, the single pinion type planetary gear device can form the differential mechanism in a simplified structure.

Preferably, the switching control means switches the continuously variable transmission to the step-variable shifting state when the vehicle condition lies at the high vehicle speed exceeding the high speed running determination value for determining a predetermined high speed running area of the vehicle. With such arrangement, if an actual vehicle speed falls in the high speed running area of the vehicle exceeding the high speed running determination value, the output of the engine is transmitted mainly through the mechanical power transmitting path to the drive wheels. This suppresses a loss in conversion between power and electric energy occurring when the transmission is caused to electrically shift the speed ratio, improving fuel consumption.

Preferably, the switching control means switches the differential mechanism to the locked state when the vehicle condition lies at the high vehicle speed exceeding the high speed running determination value for determining the predetermined high speed running area of the vehicle. With such arrangement, if the actual vehicle speed falls in the high speed running area of the vehicle exceeding the high speed running determination value, the output of the engine is transmitted mainly through the mechanical power transmitting path to the drive wheels. This suppresses the loss in conversion between power and electric energy occurring when the transmission is caused to electrically shift the speed ratio, thereby improving fuel consumption.

Preferably, the switching control means places the continuously variable transmission in the step-variable shifting state when the vehicle condition lies at the high output region of the engine exceeding the high output running determination value for determining the predetermined high output running area of the vehicle. In the high output running region where the drive-force related value, such as the required drive force or the actual drive force, exceeds the high output running determination value, the output of the engine is transmitted mainly through the mechanical transmitting path to the drive wheels. Thus, the transmission is caused to electrically shift the speed ratio in a region where the vehicle runs at the low/medium speed and the low/medium output. This minimizes the maximum value of electric energy being generated by the electric motor, that is, the maximum value of electric energy being transmitted through the electric motor. This provides a further minimization of the electric motor and the drive apparatus including such an electric motor.

As used herein, the term "drive-force related value" refers to a value that is directly or indirectly related to the drive force of the vehicle, such as parameters including the output torque of the engine, the output torque of the transmission, the transmitting torque or rotational force such as the drive torque for the drive wheels appearing in the power transmitting path and the throttle valve opening required for obtaining such parameters.

Preferably, the switching control means switches the differential mechanism to the locked state when the vehicle condition lies at the high output region of the engine exceeding the high output running determination value for determining the predetermined high output running area of the vehicle. In the high output running region where the drive-force related value such as the required drive force or the actual drive force exceeding the high output running determination value, the output of the engine is transmitted mainly through the mechanical transmitting path to the drive wheels. Thus, the transmission is caused to electrically shift the speed ratio in a region where the vehicle runs at the low/medium speed and the low/medium output. This minimizes the maximum value of electric energy to be generated by the electric motor, that is, the maximum value of electric energy to be transmitted through the electric motor. Thus, the electric motor or the vehicle drive apparatus including such an electric motor can be further minimized.

Preferably, when the vehicle condition encounters a failure or defective function in control equipment of an electric system such as an electric motor or the like for the continuously variable transmission to operate as an electrically controlled continuously variable transmission, the switching control means places the continuously variable transmission in the step-variable shifting state. With such arrangement, even under a situation where the continuously variable transmission normally remains in the continuously variable shifting state, the continuously variable transmission can perform priority operation to be placed in the step-variable shifting state. Therefore, even in the presence of the step-variable shifting state, the vehicle can run at the substantially the same running condition as that achieved in the continuously variable transmission.

Preferably, when the vehicle condition encounters a failure or defective function in control equipment of an electric system such as an electric motor or the like for the differential mechanism to be placed in the differential state to electrically shift a speed ratio, the switching control means places the differential mechanism in the step-variable shifting state. With such arrangement, even under a situation where the differential mechanism normally remains in the differential state, the differential mechanism takes priority to be placed in the locked state. Therefore, even in the presence of the locked state, the vehicle can run at the substantially the same running condition as that achieved in the differential state.

Preferably, the vehicle drive apparatus can establish an overall speed ratio based on the speed ratios of the automatic transmission and the continuously variable transmission. This enables the speed ratio of the automatic transmission to be utilized with the resultant capability of obtaining the drive force in a wide range. This results in a further increase in an efficiency of the continuously variable transmission performing electrically controlled continuously variable shifting control.

Preferably, the vehicle drive apparatus can establish the overall speed ratio based on the speed ratios of the shifting portion and the differential portion. This allows the speed ratio of the shifting portion to be utilized, enabling the drive force to be obtained in a wide range.

BEST MODE FOR CARRYING OUT THE INVENTION

Figures 1, 2:
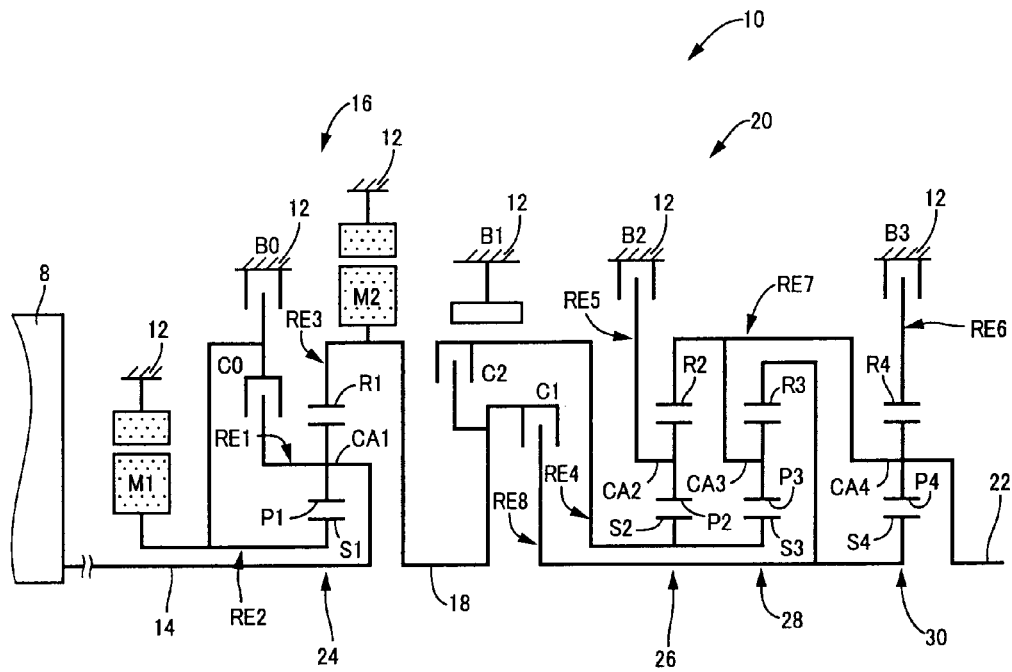
FIG. 1 is a skeleton view explaining a structure of a drive apparatus for hybrid vehicle of one embodiment according to the present invention.
FIG. 2 is an operation Table indicating a relation between a shifting operation of the drive apparatus of the hybrid vehicle of the embodiment shown in FIG. 1 operable in a continuously variable shifting state or a step-variable shifting state, and operation combinations of hydraulic-type frictionally coupling devices used therefor.

Hereinafter, embodiments of the present invention will be explained with reference to attaching drawings. FIG. 1 is a skeleton view explaining a shifting mechanism 10 constructing a part of a drive apparatus of a hybrid vehicle according to one embodiment of the present invention. The shifting mechanism 10 includes an input shaft 14, a differential portion 11, an automatic transmission 20, and an output shaft 22 all coaxially disposed in a transmission case 12 (hereinafter briefly referred to as "case 12") as a non-rotatable member fixed to a vehicle body. The input shaft 14 as an input rotation member is fixed to the case 12. The differential portion 11 is connected to the input shaft 14 directly or indirectly via a pulsation absorbing damper (vibration damping device) not shown. The automatic transmission 20 functioning as a step-variable type transmission is disposed between the differential mechanism 11 and the output shaft 22 to be connected thereto in series. The output shaft 22 as an output rotation member is connected to the automatic transmission 20.

This shifting mechanism 10 of this embodiment is suitably used for a transverse FR vehicle (front-engine, rear-drive vehicle), and is disposed between a drive power source in the form of an engine 8 such as a gasoline engine or a diesel engine, and a pair of drive wheels 38 (FIG. 5), to transmit a vehicle drive force to the pair of drive wheels 38 through a differential gear device 36 (final speed reduction gear) and a pair of drive axles.

In the shifting mechanism 10 of this embodiment, the engine 8 and the differential portion 11 is directly connected. Here, the direct connection includes, in addition to a connection without using any fluid-type transmitting device such as a torque converter or fluid coupling, a connection with using vibration damping device. Noted that a lower half of the shifting mechanism 10 constructed symmetrically with respect to its axis, is omitted in FIG. 1. This is true for other embodiments to be explained hereinafter.

The differential portion 11 includes a first electric motor M1, a power distributing mechanism 16 and a second electric motor M2. The power distributing mechanism 16 is a mechanism distributing an output of the engine 8 inputted to the input shaft 14 to the first electric motor M1 and the transmitting member 18, as the differential mechanism. The second electric motor M2 is rotatable integral with the transmitting member 18. The second electric motor M2 may be disposed at any portion of a power transmitting path extending between the transmitting member 18 and the drive wheel 38. In the present embodiment, each of the first electric motor M1 and the second electric motor M2 is a so-called motor/generator also functioning as an electric generator. The first electric motor M1 should function at least as an electric generator to generate an electric energy with generating a reaction force, and the second electric motor M2 should function at least as an electric motor to generate a drive force of the vehicle.

The power distributing mechanism 16 includes a first planetary gear unit 24 functioning as a differential device, a switching clutch C0 and a switching brake B1. The first planetary gear unit 24 of single pinion type has a gear ratio ρ1 of about 0.418, for example. It has, as rotating elements, a first sun gear S1, a first planetary gear P1, a first carrier CA1 supporting the first planetary gear P1 to be rotatable about its axis and about the axis of the first sun gear S1, and a first ring gear R1 meshing with the first sun gear S1 through the first planetary gear P1. Representing the numbers of teeth of the first sun gear S1 and the first ring gear R1 by ZS1 and ZR1, respectively, the above gear ratio ρ1 is represented by ZS1/ZR1.

In the power distributing mechanism 16, the first carrier CA1 is connected to the drive apparatus input shaft 14, i.e., to the engine 8, the first sun gear S1 is connected to the first electric motor M1, and the first ring gear R1 is connected to the transmitting member 18. The switching brake B0 is disposed between the first sun gear S1 and the casing 12, and the switching clutch C0 is disposed between the first sun gear S1 and the first carrier CA1. Upon release of both the switching clutch C0 and switching brake B0, the power distributing mechanism 16 is placed in the differential state where the first sun gear S1, first carrier CA1 and first ring gear R1 of the first planetary gear unit 24 are placed in a differential state to be rotatable relative to each other to perform a differential function. Thus, the output of the engine 8 is distributed to the first electric motor M1 and the transmitting member 18, and a part of the output distributed to the first electric motor M1 is used to generate and store power thereat or to drive the second electric motor M2.

Accordingly, the differential portion 11 (power distribution mechanism 16) functions as the electrically controlled differential device, for example, in the continuously variable shifting state (electrically controlled CVT state), in which the rotating speed of the transmitting member 18 changes continuously, irrespective of the rotating speed of the engine 8. That is, the differential portion 11 placed in the continuously variable state by the differential state of the power distributing mechanism 16 functions as the electrically controlled continuously variable transmission in which speed ratio γ0 (rotating speed of the driving device input shaft 14/rotating speed of the transmitting member 18) electrically changes from a minimum value γ0min to a maximum value γ0max.

In this state, by engagement of the switching clutch C0 or switching brake B0, the power distributing mechanism 16 is placed to the non-differential state not to perform, that is impossible to perform the differential operation. Specifically, when the first sun gear S1 and the first carrier CA1 are engaged integrally by engagement of the switching clutch C0, the rotating elements of the first planetary gear unit 24 including the first sun gear S1, first carrier CA1 and first ring gear R1 are placed in a locked state or a non-differential state to be rotatable as a unit. With this, also the differential portion 11 is placed to the non-differential state. Thus, the rotating speeds of the engine 8 and the power transmitting member 18 coincides with each other, so that the differential portion 11 (power distributing mechanism 16) is placed in a fixed shifting state, that is a step-variable shifting state functioning as the transmission having a fixed speed ratio γ0 equal to 1.

Then, when the switching brake B0 is engaged instead of the switching clutch C0 to connect the first sun gear S1 with the case 12, the power distributing mechanism 16 is placed in a locked state or non-differential state impossible to perform the differential operation with the nonrotating state of the first sun gear S1. With this, also the differential portion 11 is placed in the non-differential state. Due to the higher rotating speed of the first ring gear R1 than that of the first carrier CA1, the power distributing mechanism 16 functions as a speed-increasing mechanism. The differential portion 11 (power distributing mechanism 16) is placed in the fixed shifting state, i.e., the step-variable shifting state functioning as the speed-increasing mechanism of which a speed ratio γ0 is fixed in a value smaller than 1, for example, about 0.7.

In the present embodiment, the switching clutch C0 and switching brake B0 selectively place the differential portion 11 (power distributing mechanism 16) to the differential state i.e., non-locked state, and in the non-differential state i.e., the locked state. In detail, in the differential state, the differential portion 11 (power distributing mechanism 16) is operable as the electrically controlled differential device. For example, in the continuously variable shifting state, it is operable as the continuously variable transmission of which shifting ratio is continuously variable.

The switching clutch C0 and switching brake B0 also place the differential portion 11 (power distributing mechanism 16) in the shifting state not operable as the electrically controlled differential device. For example, in the locked state with the shifting ratio being locked in the fixed value, the differential portion 11 (power distributing mechanism 16) is not operable as the continuously variable transmission, with the continuously variable shifting operation being inoperative. In other words, in the locked state, the differential portion 11 (power distributing mechanism 16) operates as the single-stage or multi-stage transmission having one or not less than two shifting ratio(s), not operative as the continuously variable transmission, with the continuously variable shifting operation being inoperative. The locked state can otherwise be expressed as the fixed shifting state where the differential portion 11 (power distributing mechanism 16) operates as the single-stage or multi-stage transmission having one or not less than two shifting ratio(s).

The automatic transmission 20 includes plural planetary gear units, that is a single-pinion type second planetary gear unit 26, a single-pinion type third planetary gear unit 28 and a single-pinion type fourth planetary gear unit 30. The second planetary gear unit 26 includes a second sun gear S2, a second planetary gear P2, a second carrier CA2 supporting the second planetary gear P2 to be rotatable about its axis and about the axis of the second sun gear S2, and a second ring gear R2 meshing with the second sun gear S2 through the second planetary gear P2, having for example a gear ratio $\rho 2$ of about 0.562. The third planetary gear unit 28 includes a third sun gear S3, a third planetary gear P3, a third carrier CA3 supporting the third planetary gear P3 to be rotatable about its axis and about the axis of the third sun gear S3, and a third ring gear R3 meshing with the third sun gear S3 through the third planetary gear P3, having for example a gear ratio $\rho 3$ of about 0.425.

The fourth planetary gear unit 30 includes a fourth sun gear S4, a fourth planetary gear P4, a fourth carrier CA4 supporting the fourth planetary gear P4 to be rotatable about its axis and about the axis of the fourth sun gear S4, and the fourth ring gear R4 meshing with the fourth sun gear S4 through the fourth planetary gear P4, having a gear ratio $\rho 4$ of about 0.421. Representing the numbers of teeth of the second sun gear S2, second ring gear R2, third sun gear S3, third ring gear R3, fourth sun gear S4 and fourth ring gear R4 by ZS2, ZR2, ZS3, ZR3, ZS4 and ZR4 respectively, the above gear ratios $\rho 2$, $\rho 3$ and $\rho 4$ are represented by ZS2/ZR2, ZS3/ZR3, and ZS4/ZR4, respectively.

In the automatic transmission 20, the second sun gear S2 and the third sun gear S3 integrally fixed to each other as a unit are selectively connected to the transmitting member 18 through a second clutch C2, and are selectively fixed to the casing 12 through a first brake B1. The second carrier CA2 is selectively connected to the casing 12 through the second brake B2, and the fourth ring gear R4 is selectively fixed to the transmission casing 12 through a third brake B3. The second ring gear R2, third carrier CA3 and fourth carrier CA4 integrally fixed to each other are fixed to the output shaft 22. The third ring gear R3 and the fourth sun gear S4 integrally fixed to each other are selectively connected to the transmitting member 18 through a first clutch C1.

Thus, the automatic transmission 20 and the transmitting member 18 are selectively connected to each other through the first clutch C1 or the second clutch C2 used for establishing the gear shift position in the automatic transmission 20. In other words, the first clutch C1 and the second clutch C2 function as the coupling device between the transmitting member 18 and the automatic transmission 20. That is, it selectively switches the power transmitting path between the differential portion 11 (transmitting member 18) and the drive wheel 38 in a power transmitting condition allowing the power transmission therethrough, and a power interrupting condition interrupting the power transmission therethrough. That is, engagement of at least one of the first clutch C1 and the second clutch C2 bring the power transmitting path into the power transmitting condition, while release of both the first clutch C1 and the second clutch C2 bring the power transmitting path into the power interrupting condition.

The switching clutch C0, the first clutch C1, the second clutch C2, the switching brake B0, the first brake B1, the second brake B2 and the third brake B3 are hydraulic-type frictionally coupling devices used in a conventional vehicular automatic transmission. The frictionally coupling device includes a wet-type multiple-disc clutch in which a plurality of friction plates superposed on each other are forced against each other by a hydraulic actuator, or a band brake in which a rotary drum and one band or two bands wound on an outer circumferential surface thereof is tightened at one end by a hydraulic actuator.

In the shifting mechanism 10 thus constructed, as shown in an operation Table of FIG. 2, one of a first-gear position (first-speed position) through a fifth-gear position (fifth-speed position), a reverse-gear position (rear-drive position) and a neural position is selectively established by engagement of the switching clutch C0, the first clutch C1, the second clutch C2, the switching brake B0, the first brake B1, the second brake B2 and the third brake B3. Those positions have respective speed ratios $\gamma$ (input shaft speed $N_{IN}$/Output shaft speed $N_{OUT}$) which change as geometric series.

In particular, in this embodiment, by engagement of any of the switching clutch C0 and switching brake B0 provided in the power distributing mechanism 16, the differential portion 11 can construct, in addition to the continuously variable shifting state operable as the continuously variable transmission, the fixed shifting state operable as the transmission of the fixed shifting ratio. Accordingly, in the shifting mechanism 10, the differential portion 11 placed in the fixed shifting state by engagement of any of the switching clutch C0 and switching brake B0, and the automatic transmission 20 construct the step variable shifting state operable as the step-variable transmission. The differential portion 11 placed in the continuously variable shifting state by non-engagement of both the switching clutch C0 and switching brake B0, and the automatic transmission 20 construct the continuously variable shifting state operable as the continuously variable transmission. In other words, the shifting mechanism 10 is switched to the step-variable shifting state by engagement of any of the switching clutch C0 and switching brake B0, and is switched to the continuously variable shifting state by non-engagement of both the switching clutch C0 and switching brake B0. The differential portion 11 is the transmission also switched to the step-variable shifting state and the continuously variable shifting state.

For example, when the shifting mechanism 10 functions as the step-variable transmission, for example, as shown in FIG. 2, engagement of the switching clutch C0, the first clutch C1 and the third brake B3 establish the first-gear position having the highest speed ratio γ1 of about 3.357, for example, and engagement of the switching clutch C0, the first clutch C1 and the second brake B2 establish the second-gear position having the speed ratio γ2 of about 2.180, for example, which is lower than the speed ratio γ1. Further, engagement of the switching clutch C0, first clutch C1 and first brake B1 establish the third-gear position having the speed ratio γ3 of about 1.424, for example, which is lower than the speed ratio γ2, and engagement of the switching clutch C0, first clutch C1 and second clutch C2 establish the fourth-gear position having the speed ratio γ4 of about 1.000, for example, which is lower than the speed ratio γ3.

Engagement of the first clutch C1, second clutch C2 and switching brake B0 establish the fifth-gear position having the speed ratio γ5 of about 0.705, for example, which is smaller than the speed ratio γ4. Further, engagement of the second clutch C2 and the third brake B3 establish the reverse-gear position having the speed ratio γR of about 3.209, for example, which positions between the speed ratios γ1 and γ2. The neutral position N is established by engaging only the switching clutch C0.

However, when the shifting mechanism 10 functions as the continuously variable transmission, as shown in FIG. 2, the switching clutch C0 and the switching brake B0 are both released. With this, the differential portion 11 functions as the continuously variable transmission, and the automatic transmission 20 connected in series thereto functions as the step-variable transmission. The rotating speed to be input to the automatic transmission 20 placed in one of the first-gear, second-gear, third-gear and fourth-gear positions, that is the rotating speed of the transmitting member 18 is continuously changed so that the continuous shifting ratio width can be obtained for each of the gear positions. Accordingly, since the speed ratio of the automatic transmission 20 is continuously variable across the adjacent gear positions, a total speed ratio γT (overall speed ratio) of the shifting mechanism 10 is continuously variable.

Figure 3:
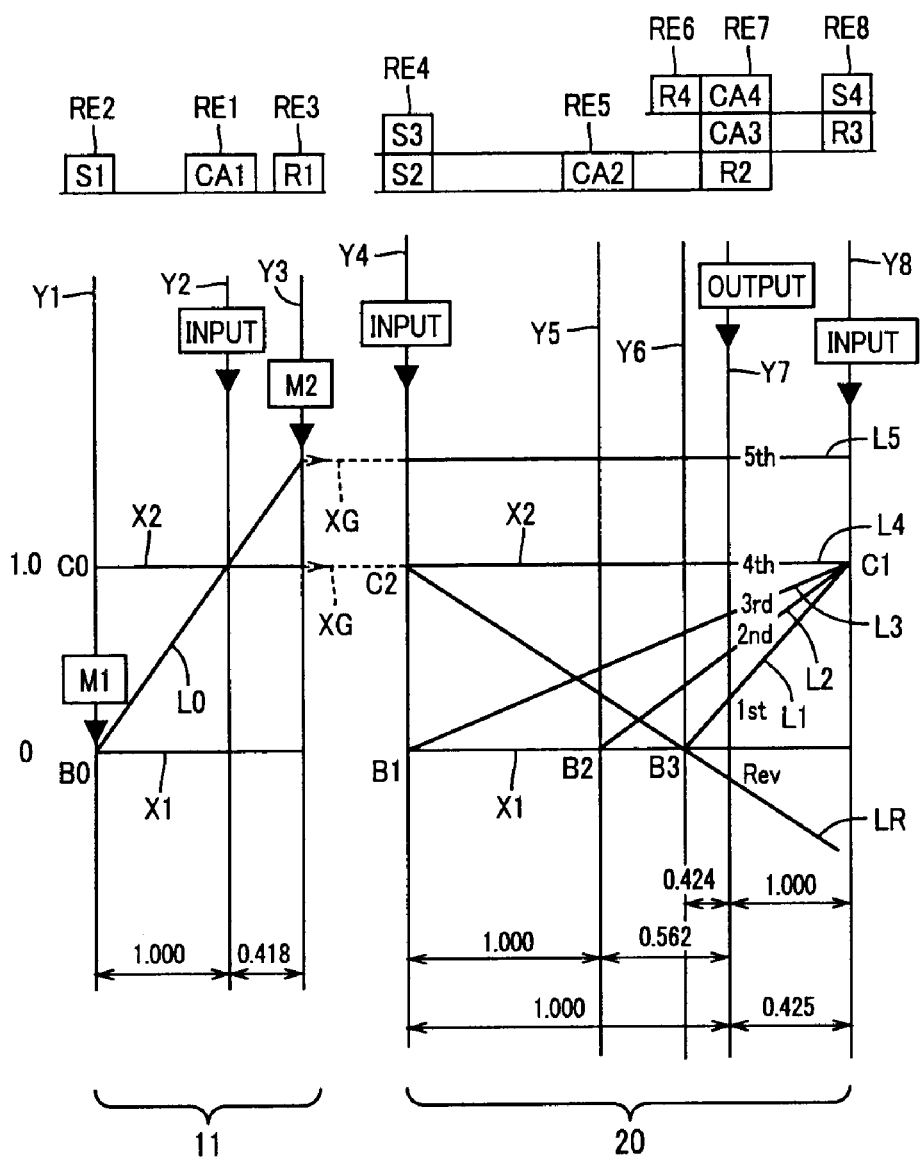
FIG. 3 is a collinear chart showing relative rotating speeds of rotating elements in each of different gear positions when the drive apparatus of the hybrid vehicle of the embodiment shown in FIG. 1 is operated in the step-variable shifting state.

FIG. 3 shows a collinear chart representing by straight lines a relation among the rotating speeds of the rotating elements different in each of the gear positions of the shifting mechanism 10. The shifting mechanism 10 is constituted by the differential portion 11 functioning as the continuously variable shifting portion or first shifting portion, and the automatic transmission 20 functioning as the step-variable shifting portion or second shifting portion. The collinear chart of FIG. 3 is a rectangular two-dimensional coordinate system in which the gear ratios ρ of the planetary gear units 24, 26, 28 and 30 are taken along the horizontal axis, while the relative rotating speeds of the rotating elements are taken along the vertical axis. A lower one X1 of three horizontal lines indicates the rotating speed of 0, and an upper one X2 indicates the rotating speed of 1.0, that is, an operating speed $N_E$ of the engine 8 connected to the input shaft 14. The horizontal line XG indicates the rotating speed of the transmitting member 18.

Among three vertical lines Y1, Y2 and Y3 corresponding to the three elements of the differential portion 11, respectively represent from the left the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined corresponding to the gear ratio ρ1 of the first planetary gear unit 24.

Further, five vertical lines Y4, Y5, Y6, Y7 and Y8 corresponding to the automatic transmission 20 respectively represent from the left the relative rotating speeds of a fourth rotary element (fourth element) RE4, a fifth rotary element (fifth element) RE5, a sixth rotary element (sixth element) RE6, a seventh rotary element (seventh element) RE7, and an eighth rotary element (eighth element) RE8. The fourth rotary element RE4 has a form of the second and third sun gears S2, S3 integrally fixed to each other, the fifth rotary element RE5 has a form of the second carrier CA2, and the sixth rotary element RE6 has a form of the fourth ring gear R4. The seventh rotary element RE7 has a form of the second ring gear R2 and third and fourth carriers CA3, CA4 integrally fixed to each other, and the eighth rotary element RE8 has a form of the third ring gear R3 and fourth sun gear S4 integrally fixed to each other.

The distances between the adjacent ones of the vertical lines Y4 to Y8 are determined by the gear ratios ρ2, ρ3 and ρ4 of the second, third and fourth planetary gear units 26, 28 and 30. That is, as shown in FIG. 3, for each of the second, third and fourth planetary gear units 26, 28 and 30, the distances between the sun gear and carrier corresponds to "1", and the distances between the carrier and ring gear corresponds to the gear ratio ρ.

Expressing with the collinear chart of FIG. 3, the shifting mechanism 10 of this embodiment is, in the power distribution mechanism 16 (continuously variable shifting portion 11), arranged such that the first rotary element RE1 (the first carrier CA1), which is one of the three rotating elements of the first planetary gear unit 24, is fixed to the input shaft 14, and selectively connected to the second rotary element RE 2 (first sun gear S1) as another rotary element through the switching clutch C0. The second rotary element RE2 is fixed to the first electric motor M1 and selectively fixed to the casing 12 through the switching brake B0. The third rotary element RE3 (the first ring gear R1) as still another rotary element is fixed to the transmitting member 18 and the second electric motor M2. Thus, rotation of the input shaft 14 is transmitted (inputted) to the automatic transmission (step-variable transmission portion) 20 through the transmitting member 18. An inclined straight line L0 which passes an intersection point between the lines Y2 and X2 represents a relation between the rotating speeds of the first sun gear S1 and the first ring gear R1.

For example, when the shifting mechanism 10 is switched to the continuously variable shifting state (differential state) by release of the switching clutch C0 and the switching brake B0, rotation of the sun gear S1 represented by the intersection point between the straight line L0 and the vertical line Y1 increases of decreases by control of the rotation speed of the first electric motor M1. When the rotation speed of the ring gear R1 determined depending on the vehicle speed V is substantially constant, the rotation speed of the first carrier CA1 represented by the intersection point between the straight line L0 and the vertical line Y2 increases or decreases. When the first sun gear S1 and the first carrier CA1 are connected by engagement of the switching clutch C0, the power transmitting mechanism 16 is brought into the non-differential state when the above three rotary elements are integrally rotated. Thus, the straight line L0 coincides with the lateral line X2, so that the transmitting member 18 rotates in the same rotation speed as the engine rotation speed.

Alternately, with rotation halt of the first sun gear S1 by engagement of the switching brake B0, the power distributing mechanism 16 is brought into the non-differential state functioning as the speed increasing mechanism. Thus, the rotation speed of the first ring gear R1, i.e., the transmitting member 18 is represented by the intersection point between the straight line L0 which is in the state shown in FIG. 3 and the vertical line Y3, being inputted to the automatic transmission in the increased rotation speed compared with the engine rotation speed $N_E$.

In the automatic transmission 20, the fourth rotary element RE4 is selectively connected to the transmitting member 18 through the second clutch C2 and selectively fixed to the casing 12 through the first brake B1, the fifth rotary element RE5 is selectively fixed to the casing 12 through the second brake B2, and the sixth rotary element RE6 is selectively fixed to the casing 12 through the third brake B3. The seventh rotary element RE7 is fixed to the output shaft 22, and the eighth rotary element RE8 is selectively connected to the transmitting member 18 through the first clutch C1.

As shown in FIG. 3, in the automatic transmission 20, upon engagement of the first clutch C1 and the third brake B3, the rotating speed of the output shaft 22 in the first-speed position is represented by an intersection point between the inclined linear line L1 and the vertical line Y7. Here, the inclined straight line L1 passes an intersection point between the vertical line Y8 indicative of the rotating speed of the eighth rotary element RE8 and the horizontal line X2, and an intersection point between the vertical line Y6 indicative of the rotating speed of the sixth rotary element RE6 and the horizontal line X1.

Similarly, the rotating speed of the output shaft 22 in the second-speed position is represented by an intersection point between an inclined straight line L2 determined by engagement of the first clutch C1 and second brake B2, and the vertical line Y7 indicative of the rotating speed of the seventh rotary element RE7 fixed to the output shaft 22. The rotating speed of the output shaft 22 in the third-speed position is represented by an intersection point between an inclined straight line L3 determined by engagement of the first clutch C1 and first brake B1, and the vertical line Y7 indicative of the rotating speed of the seventh rotary element RE7 fixed to the output shaft 22. The rotating speed of the output shaft 22 in the fourth-speed position is represented by an intersection point between a horizontal line L4 determined by engagement of the first clutch C1 and second clutch C2, and the vertical line Y7 indicative of the rotating speed of the seventh rotary element RE7 fixed to the output shaft 22.

In the first-speed through fourth-speed positions, as result of engagement of the switching clutch C0, power from the differential portion 11 i.e., the power distributing mechanism 16 is inputted to the eighth rotary element RE8 with the rotating speed the same as that of the engine speed $N_E$. However, when the switching clutch B0 engages instead of the switching clutch C0, since power from the differential portion 11 is inputted to the eighth rotary element RE8 with a speed higher than the engine speed $N_E$, the rotating speed of the output shaft 22 in the fifth-speed position is represented by an intersection point between a horizontal line L5 and the vertical line Y7. Here, the horizontal line L5 is determined by engagement of the first clutch C1, second clutch C2 and switching brake B0, and the vertical line Y7 indicates the rotating speed of the seventh rotary element RE7 fixed to the output shaft 22.

Figure 4:
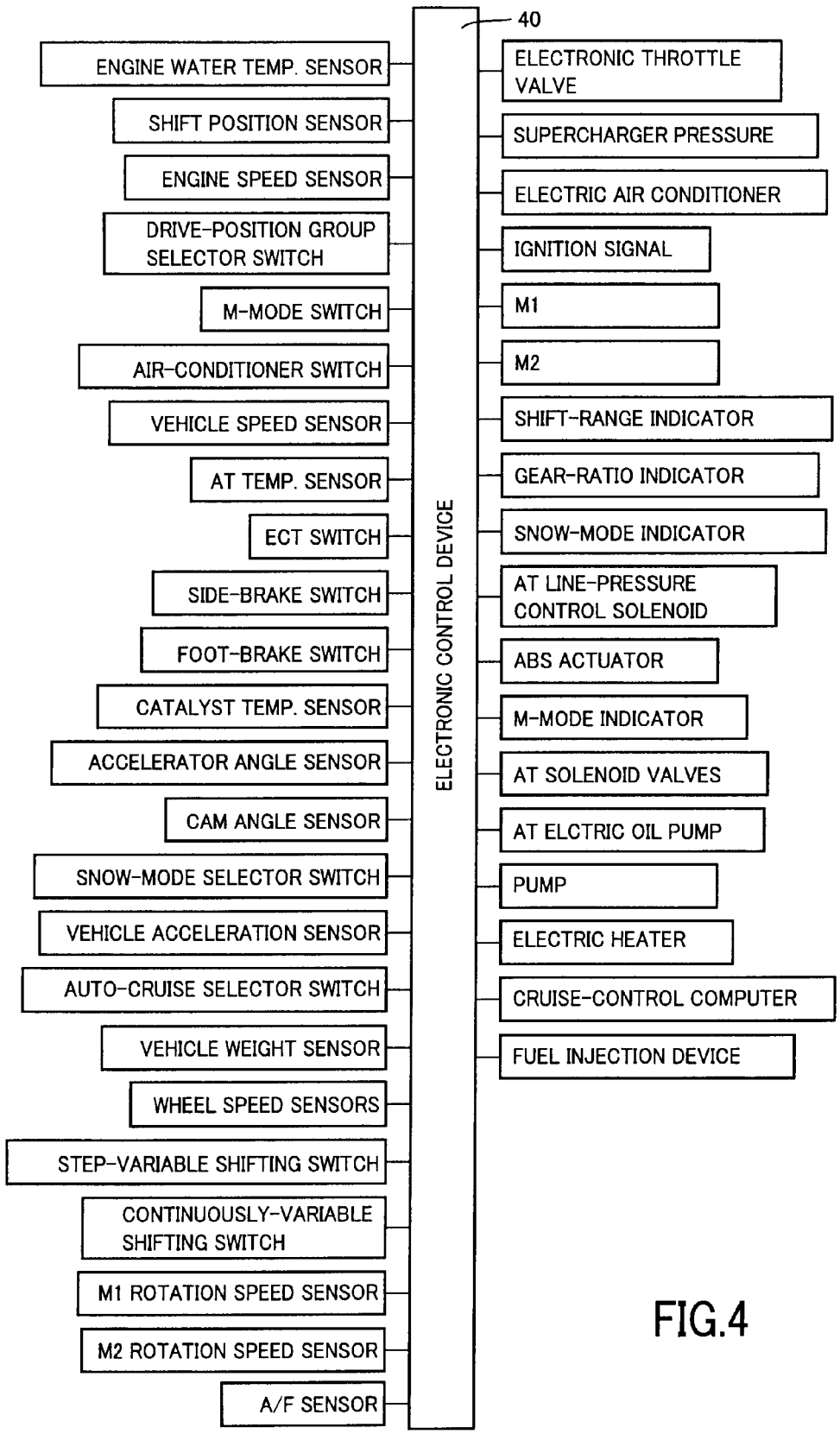
FIG. 4 is a view explaining input and output signals of an electronic control device provided in the drive apparatus of the embodiment shown in FIG. 1.

FIG. 4 illustrates signals input to an electronic control device 40 and signals output therefrom to control the shifting mechanism 10. This electronic control device 40 includes a so-called microcomputer incorporating a CPU, a ROM, a RAM and an input/output interface. By performing signal processing according to programs stored in the ROM utilizing a temporary data storage function of the ROM, it implements hybrid drive controls of the engine 8 and electric motors M1 and M2, and drive controls such as shifting controls of the automatic transmission 20.

To the electronic control device 40, from various sensors and switches shown in FIG. 4, various signals are inputted, which include a signal indicative of a temperature $TEMP_W$ of cooling water of the engine, a signal indicative of a selected operating position $P_{SH}$ of a shift lever, a signal indicative of the operating speed $N_E$ of the engine 8, a signal indicative of a set value of gear ratio row, a signal indicative of a command for M mode (motor drive mode), a signal indicative of an operated state of an air conditioner, a signal indicative of a vehicle speed V corresponding to the rotating speed $N_{OUT}$ of the output shaft 22, a signal indicative of a working oil temperature of the automatic transmission 20, a signal indicative of an operated state of a side brake, a signal indicative of an operated state of a foot brake, a signal indicative of a catalyst temperature, a signal indicative of an opened amount $A_{CC}$ of an accelerator pedal, a signal indicative of a cam angle, a signal indicative of a snow drive mode, a signal indicative of a longitudinal acceleration value of the vehicle, and a signal indicative of an auto-cruising drive mode.

Also inputted are a signal indicative of a vehicle weight, a signal indicative of wheel speed of each drive wheel, a signal indicative of operation of a step-variable switch for changing the differential portion 11 (power transmitting mechanism 16) to the step-variable shifting state (locked state) so that the shifting mechanism 10 functions as the step-variable transmission, a signal indicative of operation of a continuous-variable switch for changing the differential portion 11 (power transmitting mechanism 16) to the continuously variable shifting state (differential state) so that the shifting mechanism 10 functions as the continuously variable transmission, a signal indicative of the rotating speed $N_{M1}$ of the first electric motor M1, a signal indicative of the rotating speed $N_{M2}$ of the second electric motor M2, and a signal indicative an air-fuel ratio A/F of the engine 8.

From the electronic control device 40, various control signals are outputted to the engine output control device 43 (refer to FIG. 5) which controls the engine output, which includes a signal to drive a throttle actuator 97 for controlling an opening degree $\theta_{TH}$ of a throttle valve 96 disposed in a suction tube 95 of the engine 8, a signal to control fuel supply amount to each cylinder of the engine 8 by a fuel injection tube 98, a signal to command an ignition timing in the engine 8 by an ignition device 99, a signal to adjust a supercharger pressure, a signal to operate the electric air conditioner, a signal for controlling an ignition timing of the engine 8, signals to operate the electric motors M1 and M2, a signal to operate a shift-range indicator for indicating the selected operating position of the shift lever, a signal to operate a gear-ratio indicator for indicating the gear ratio, a signal to operate a snow-mode indicator for indicating the selection of the snow drive mode, a signal to operate an ABS actuator for anti-lock braking of the wheels, and a signal to operate an M-mode indicator for indicating the selection of the M-mode.

Also outputted are signals to operate solenoid-operated valves incorporated in a hydraulic control unit 42 provided to control the hydraulic actuators of the hydraulically operated frictional coupling devices of the differential portion 11 and the automatic transmission 20, a signal to operate an electric oil pump used as a hydraulic pressure source for the hydraulic control unit 42, a signal to drive an electric heater, a signal to be applied to a cruise-control computer, and a signal indicative of an fuel injection device.

Figure 5:
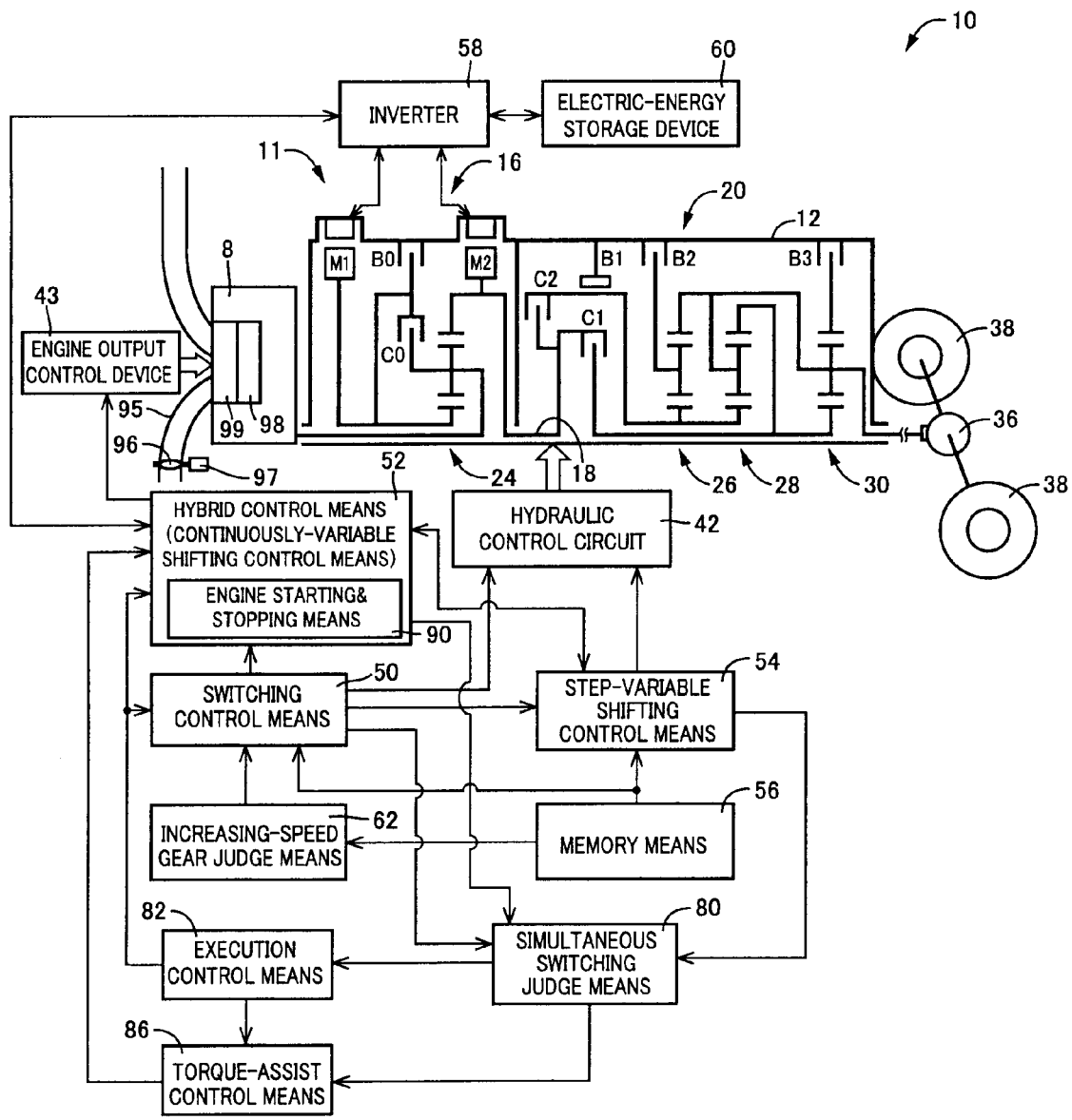
FIG. 5 is a functional block diagram explaining an essence of control operation to be executed by the electronic control device shown in FIG. 4.
Figure 6:
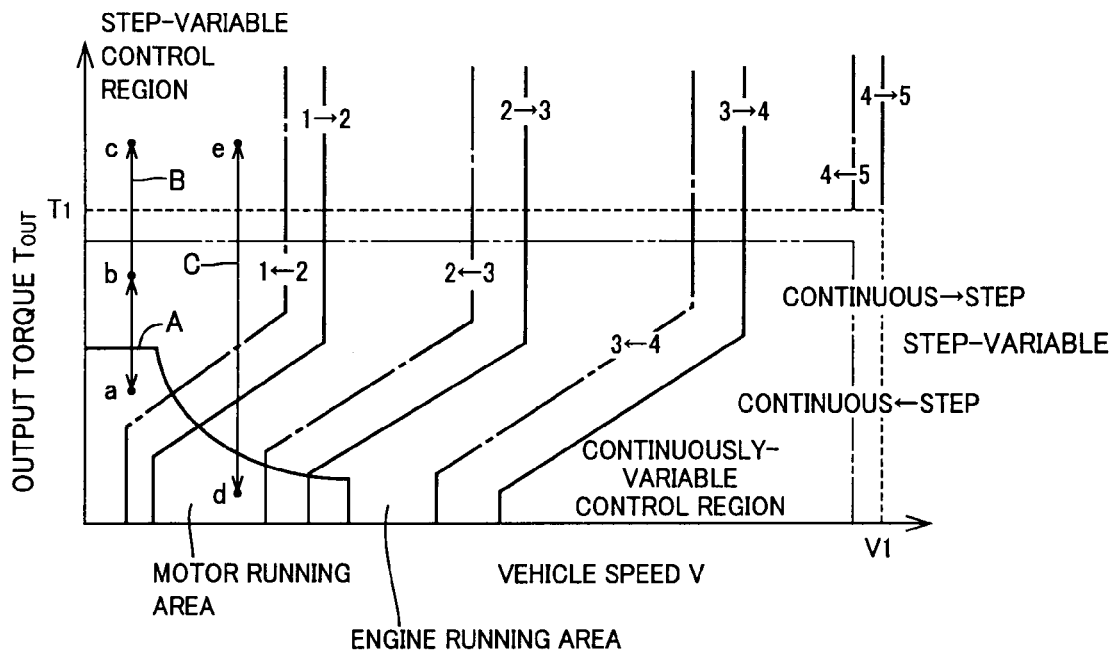
FIG. 6 is a view representing one example of a preliminarily stored shifting diagram based on which a determination on the gear shifting is executed in the automatic transmission, one example of a preliminarily stored shifting diagram based on which a determination on the switching of a shifting state is executed in a shifting mechanism, and one example of a preliminarily stored drive-force source switching diagram having a boundary line between an engine running area and a motor running area for an engine running mode and a motor running mode to be switched. They are plotted on a two-dimensional coordinate in terms of as the same parameters as the vehicle speed and output torque, while representing respective relations.

FIG. 5 is a functional block diagram for illustrating an essential part of a control function to be performed with the electronic control device 40. In FIG. 5, the step-variable shifting control means 54 functions as shifting control means for performing the gear shifting in the automatic transmission 20. For instance, the step-variable shifting control means 54 discriminates whether to perform the gear shifting in the automatic transmission 20 on the basis of the vehicle condition indicative of the vehicle speed V and the required output torque $T_{out}$ for the automatic transmission 20 by referring to the relations (including the shifting diagram and the shifting map), preliminarily stored in the memory means 56, which are shown in FIG. 6 in solid lines and single dot lines.

That is, the step-variable shifting control means 54 discriminates a shifting position, for which the gear shifting is performed with the automatic transmission 20, to allow the automatic transmission 20 to perform the gear shifting so as to obtain the discriminated shifting position. When this takes place, the step-variable shifting control means 54 outputs a command (shifting output command) to a hydraulic control circuit 42 for coupling and/or uncoupling the hydraulically operated frictional coupling device, excepting the switching clutch C0 and the switching brake B0, so as to achieve a desired shifting position in accordance with, for instance, the operation Table shown in FIG. 2.

Hybrid control means 52 renders the engine 8 operative in an operating region at high efficiency under the continuously variable shifting state of the shifting mechanism 10, that is, the differential state of the differential portion 11. Meanwhile, the hybrid control means 52 allows the rates of drive force being distributed to the engine 8 and the second electric motor M2 and a reactive force of the first electric motor M1 due to the operation thereof for generating electric power to be varied to optimum values, thereby controlling a speed ratio γ0 of the differential portion 11 placed as an electrically controlled continuously variable transmission. For instance, the hybrid control means 52 calculates a target (demanded) output of the vehicle by referring to the displacement value Acc of an accelerator pedal and the vehicle speed V indicative of the amount of output required by a vehicle driver at the current running speed of the vehicle.

Then, the hybrid control means 52 calculates a demanded total target output based on the target output of the vehicle and a charging request value. In order to obtain the total target output, the hybrid control means 52 calculates a target engine output with taking account of the transmitting loss, loads on auxiliary units, the assisting torque of the second electric motor M2, etc. Then, the hybrid control means 52 controls the engine 8 so as to provide the engine speed $N_E$ and the engine torque $T_E$ such that the target engine output is obtained, while controlling the amount of electric power being generated by the first electric motor M1.

The hybrid control means 52 performs hybrid control with taking account of the gear position of the automatic transmission 20 to obtain drive power performance while improving fuel consumption. Such hybrid control allows the differential portion 11 to function as the electrically controlled continuously variable transmission so as to allow the engine speed $N_E$, determined for the engine 8 to operate at a high efficiency, to match the rotating speed of the transmitting member 18 that is determined based on the vehicle speed V and the selected gear position of the automatic transmission 20. To this end, the hybrid control means 52 preliminarily stores therein an optimum fuel economy curve (including the fuel economy map and the relations) that is preliminarily determined on an experimental basis. This allows a compromise to be obtained, during the running of the vehicle under the continuously variable shifting state, between drivability of the vehicle and fuel economy performance of the engine 8 on the two-dimensional coordinate with the parameters including, for instance, the engine speed $N_E$ and the output torque (engine torque) $T_E$ of the engine 8.

Thus, the hybrid control means 52 determines a target value of the total speed ratio γT of the shifting mechanism 10 so as to obtain the engine torque $T_E$, causing the engine to generate an output required for satisfying, for instance, the target output (overall target output and required drive force), and the engine speed $N_E$. This enables the engine 8 to operate on the optimum fuel economy curve. Then, the hybrid control means 52 controls the speed ratio γ0 of the differential portion 11 so as to achieve the target value. This allows the total speed ratio γT to be controlled within a variable shifting range, for instance, from 13 to 0.5.

During such hybrid control, the hybrid control means 52 allows electric energy generated by the first electric motor M1 to be supplied to an electric-energy storage device 60 and the second electric motor M2 through an inverter 58. This allows a major portion of the drive force of the engine 8 to be mechanically transmitted to the transmitting member 18. When this takes place, a portion of the drive force of the engine is consumed with the first electric motor M1 for generating electric power to be converted to electric energy. The electric energy is supplied through the inverter 58 to the second electric motor M2, which in turn is driven to transfer the drive force from the second electric motor M2 to the transmitting member 18. Equipment, related to the operations from a phase of generating the electric energy to a phase in which the electric energy is consumed with the second electric motor M2, constitutes an electric path in which the portion of the drive force of the engine 8 is converted to the electric energy which in turn is converted to the mechanical energy.

The hybrid control means 52 functionally includes engine output control means. The engine output control means allows a throttle actuator 97 to perform throttle control so as to open or close an electronic throttle valve 96. In addition, the engine output control means allows a fuel injection device 98 to control a fuel injection quantity and fuel injection timing for performing fuel injection control. Further, the engine output control means outputs commands to the engine output control device 43 independently or in combination. This allows the engine 8 to perform output control so as to fundamentally provide the required engine output. For instance, the hybrid control means 52 drives the throttle actuator 60 in response to an acceleration opening signal Acc by referring to the preliminarily stored relation, which is not shown, such that the greater the accelerator opening Acc, the greater will be the throttle valve opening $\theta_{TH}$.

A solid line A, shown in FIG. 6, represents a boundary line between the engine running area and the motor running area for the drive power source of the vehicle for starting up/running (hereinafter referred to as "for running") thereof to be switched to the engine 8 and the electric motor, that is, for instance, the second electric motor M2. In other words, the boundary line is used for switching the so-called engine running area, in which the engine 8 is caused to act as a running drive power source for starting up/running (hereinafter referred to as "running") the vehicle, and the so-called motor running area in which the second electric motor M2 is caused to act as a drive power source for running the vehicle.

The preliminarily stored relation, having the boundary line (in the solid line A) shown in FIG. 6 for switching the engine running area and the motor running area, represents one example of the drive-force source switching diagram (drive power source map), formed in a two-dimensional coordinate, which takes the vehicle speed V and the output torque $T_{OUT}$, indicative of the drive-force related value, as parameters. Memory means 56 preliminarily stores the drive-force source switching diagram together with, for instance, the solid line and the shifting diagram (shifting map) designated by the single dot line which are shown in FIG. 6.

The hybrid control means 52 determines based on the vehicle condition, represented by the vehicle speed V and the required torque output $T_{OUT}$ by referring to, for instance, the drive-force source switching diagram shown in FIG. 6 to find whether the motor running area or the engine running area is present, thereby effectuating the motor running area or the engine running area. As will be apparent from FIG. 6, the hybrid control means 52 executes the motor running area at the relatively low output torque $T_{OUT}$, that is, the low engine torque $T_E$ in which the engine efficiency is generally lower than that in the high torque region, or the relatively low vehicle speed area in the vehicle speed V, that is, the low load region.

In order to suppress a drag of the engine 8 in a halted state thereof for improving the fuel economy, the hybrid control means 52 renders the differential portion 11 operative to perform an electrical CVT function (differential function) during the motor running area. This enables the rotating speed $N_{M1}$ of the first electric motor M1 to be controlled in a negative rotating speed, for instance, an idling state. This causes the engine speed $N_E$ to be maintained at a zeroed or nearly zeroed value.

The hybrid control means 52 includes engine starting and stopping control means 90 that switches an operating state of the engine 8 between an operating state and a halted state. Thus, the switching can be executed between the engine running area and the motor running area, that is, for starting and stopping the engine 8. The engine starting and stopping control means 90 effectuates the starting or the stopping of the engine 8 when the hybrid control means 52 determines based on the vehicle condition upon referring to, for instance, the drive-force source switching diagram shown in FIG. 6 that the switching is to be executed between the motor running area and the engine running area.

For instance, the engine starting and stopping control means 90 effectuates the starting of the engine 8 as described below. That is, as shown by a transition "a"→"b" on the solid line B in FIG. 6, as the accelerator pedal is depressed, the required output torque $T_{OUT}$ increases. This causes the vehicle condition to vary from a motor running area to an engine running area. When this takes place, the engine starting and stopping control means 90 turns on the first electric motor M1 to increase the rotating speed $N_{M1}$ thereof.

That is, the first electric motor M1 is caused to function as a starter to increase the engine speed $N_E$. The engine starting and stopping control means 90 allows the ignition device 99 to perform the ignition at a given engine speed $N_E'$, that is, for instance, the engine speed $N_E$ enabling an autonomous rotation thereof, thereby effectuating the startup of the engine 8. Then, the engine starting and stopping control means 90 allows the hybrid control means 52 to switch the motor running area to the engine running area. When this takes place, the engine starting and stopping control means 90 may operate so as to rapidly increase the rotating speed $N_{M1}$ of the first electric motor M1 for rapidly increasing the engine speed $N_E$ to the given engine speed $N_E'$. This immediately avoids the occurrence of a resonating region in an engine speed area less than a well-known idling rotating speed $N_{EIDL}$, so that the vibration of the engine during start-up thereof is suppressed.

Further, as shown by a transition "b"→"a" on the solid line B in FIG. 6, if the accelerator pedal is released, the required output torque $T_{OUT}$ decreases and the vehicle condition varies from the engine running area to the motor running area. In this moment, the engine starting and stopping control means 90 causes the fuel injection device 98 to stop the supply of fuel to the engine 8, that is, performing the fuel cut-off to stop the engine 8. Subsequently, the hybrid control means 52 effectuate the switching from the engine running area to the motor running area. When this takes place, the engine starting and stopping control means 90 may operate so as to rapidly lower the rotating speed $N_{M1}$ of the first electric motor M1 to cause the engine speed $N_E$ to immediately decrease to the zeroed or nearly zeroed value. This promptly avoids the occurrence of the resonating region, thereby suppressing the vibration during the halt of the engine 8. In another alternative, the engine starting and stopping control means 90 may operate so as to decrease the rotating speed $N_{M1}$ of the first electric motor M1 in priority to the operation of the fuel cut-off for decreasing the engine speed $N_E$. This allows the fuel cut-off to be effectuated at the given engine speed $N_E'$, thereby stopping the engine 8.

Further, even under the engine running area, the hybrid control means 52 may allow the electric path to be established. In this moment, the electric energies resulting from the first electric motor M1 and/or the electric-storage device 60 are supplied to the second electric motor M2. Thus, the second electric motor M2 is driven to make it possible to perform torque-assisting for the drive force of the engine 8. Thus, in the illustrated embodiment, the engine running area may cover a phase including the engine running area and the motor running area in combination.

Further, the hybrid control means 52 may cause the differential portion 11 to have the electrical CVT function through which the engine 8 can be maintained under the operating state regardless of the halted condition or the low speed condition of the vehicle. For instance, if a drop occurs in a state of charge SOC of the electric-storage device 60 during the halt of the vehicle, the first electric motor M1 needs to generate electric power. In this moment, the drive force of the engine 8 causes the first electric motor M1 to generate electric power while the rotating speed of the first electric motor M1 increases. Thus, even if the rotating speed $N_{M2}$ of the second electric motor M2, uniquely determined with the vehicle speed V, becomes zero (nearly zero) due to the halted condition of the vehicle, the power distributing mechanism 16 performs the differential action. This causes the engine speed $N_E$ to be maintained at a level beyond a rotating speed for autonomous rotation.

Furthermore, the hybrid control means 52 allows the differential portion 11 to perform the electrical CVT function to control the rotating speed $N_{M1}$ of the first electric motor M1 and the rotating speed $N_{M2}$ of the second electric motor M2. This causes the engine speed $N_E$ to be maintained at an arbitrary level of the rotating speeds regardless of the vehicle remaining under the halted or running state. For instance, as will be understood from the collinear diagram shown in FIG. 3, when increasing the engine speed $N_E$, the hybrid control means 52 executes the operation to raise the rotating speed $N_{M1}$ of the first electric motor M1 while maintaining the rotating speed $N_{M2}$ of the second electric motor M2, restricted with the vehicle speed V, at a substantially fixed level.

Increasing-speed gear judge means 62 makes a determination on which of the switching clutch C0 and the switching brake B0 is to be coupled for placing the shifting mechanism 10 in the step-variable shifting state. That is, the determination is made based on the vehicle condition according to, for instance, the shifting diagram, shown in FIG. 6, which is preliminarily stored in the memory means 56, to find whether or not the gear position to be shifted in the shifting mechanism 10 lies in an increasing-speed gear position, for instance, a 5th-speed gear position.

Switching control means 50 switches the coupling and/uncoupling states of the differential state switching means (switching clutch C0 and switching brake B0) depending on the vehicle condition. This allows the continuously variable shifting state and the step-variable shifting state, that is, the differential state and the locked state to be selectively switched. For instance, the switching control means 50 determines whether to switch the shifting state of the shifting mechanism 10 (differential portion 11) based on the vehicle condition represented with the vehicle speed V and the required output torque $T_{OUT}$. This determination is made by referring to the relations (shifting diagram and shifting map), preliminarily stored in the memory means 56, which are shown in the dotted line and the double dot line in FIG. 6. That is, the determination is made to find whether the shifting mechanism 10 lies in a continuously variable shifting control region for the continuously variable shifting state or a step-variable shifting control region for the step-variable shifting state. Thus, the determination is made on the shifting state to be switched by the shifting mechanism 10. Then, the switching control means 50 effectuates the switching of the shifting state for selectively placing the shifting mechanism 10 in any one of the continuously variable shifting state and the step-variable shifting state.

More particularly, if the determination is made that the shifting mechanism 10 lies in the step-variable shifting control region, then, the switching control means 50 outputs a command to the hybrid control means 52 disenabling or interrupting the hybrid control or continuously variable shifting control, while permitting the step-variable shifting control means 54 to perform the shifting for the predetermined step-variable shifting operation. When this takes place, the step-variable shifting control means 54 allows the automatic transmission 20 to perform the automatic shifting in accordance with, for instance, the shifting diagram, shown in FIG. 6, which is preliminarily stored in the memory means 56. For instance, FIG. 2 shows the operation Table, preliminarily stored in the memory means 56, which represents combinations in operation of the hydraulically operated frictional coupling devices, that is, the clutches C0, C1, C2, and the brakes B0, B1, B2 and B3 to be selected in the shifting control. That is, the shifting mechanism 10, that is, the differential portion 11 and the automatic transmission 20, functions as a whole to be the so-called step-variable automatic transmission, thereby establishing the gear positions according to the operation Table shown in FIG. 2.

If the increasing-speed gear judge means 62 determines the 5th-gear position, the switching control means 50 outputs a command to the hydraulic control circuit 42 for uncoupling the switching clutch C0 and coupling the switching brake B0. This causes the differential portion 11 to function as an auxiliary power transmission with a fixed speed ratio γ0, for instance, the speed ratio γ0 equal to "0.7". Thus, the shifting mechanism 10 can act as a whole to obtain an increasing-speed gear position, that is, a so-called overdrive-gear position with a speed ratio less than 1.0. In contrast, if no 5th-gear position is determined by the increasing-speed gear judge means 62, the switching control means 50 outputs a command to the hydraulic control circuit 42 for coupling the switching clutch C0 and uncoupling the switching brake B0. This causes the differential portion 11 to function as the auxiliary power transmission with the fixed speed ratio γ0, for instance, the speed ratio γ0 equal to 1. Thus, the shifting mechanism 10 can act as a whole to obtain a decreasing-speed gear position with a speed ratio greater than 1.0.

Thus, the switching control means 50 can perform the switching of the shifting mechanism 10 in the step-variable shifting state and selectively performs the switching for the gear positions of two kinds in either one gear position under the step-variable shifting state. This causes the differential portion 11 to function as the auxiliary power transmission and the automatic transmission 20, connected to the differential portion 11 in series, is caused to function as the step-variable transmission. Thus, the shifting mechanism 10 is caused to function as the so-called step-variable automatic transmission as a whole.

On the contrary, if the determination is made that the shifting mechanism 10 lies in the step-variable shifting control region to be switched to the continuously variable shifting state, the switching control means 50 outputs a command to the hydraulic control circuit 42 for uncoupling both the switching clutch C0 and the switching brake B0. This causes the shifting mechanism 10 to be placed in the continuously variable shifting state for enabling a continuously variable shifting to be performed. Thus, the shifting mechanism 10 can act as a whole to obtain the continuously variable shifting state.

Concurrently, the switching control means 50 outputs a command to the hybrid control means 52 for permitting the hybrid control. In addition, the switching control means 50 outputs a signal to the step-variable shifting control means 54 for fixing the shifting mechanism 10 in the gear position for the predetermined continuously variable shifting state. Or, a signal is outputted to the step-variable shifting control means 54 for permitting the automatic transmission 20 to perform automatic shifting according to, for instance, the shifting diagram, shown in FIG. 6, which are preliminarily stored in the memory means 56. In such a case, the variable-step shifting control means 54 executes the operations as shown in the operation Table of FIG. 2 excepting the coupling operations of the switching clutch C0 and brake B0, thereby performing the automatic shifting.

Thus, the switching control means 50 switches the differential portion 11 to be placed in the continuously variable shifting state to function as the continuously variable transmission. In addition, the automatic transmission 20, connected to the differential portion 11 in series, is caused to function as the step-variable transmission. This results in the occurrence of a drive force with a suitable magnitude. Simultaneously, a continuously variable change occurs in the rotating speed input to the automatic transmission 20, that is, the rotating speed of the transmitting member 18 applied to the automatic transmission 20 for each gear position of the 1st-gear, 2nd-gear, 3rd-gear and 4th-gear positions. Thus, the respective gear positions are established in speed ratios over a continuously variable shifting range. Accordingly, since the speed ratio is continuously variable across the adjacent gear positions, the shifting mechanism 10 can achieve the overall speed ratio γT in the continuously variable shifting state.

To explain about FIG. 6 in detail, FIG. 6 represents the relations (shifting diagram and shifting map) preliminarily stored in the memory means 56 for a determination to be made to perform the gear shifting in the automatic transmission 20. FIG. 6 shows one example of the shifting diagram plotted in a two-dimensional coordinate with parameters in terms of the vehicle speed V and the required output torque $T_{OUT}$ indicative of a drive-force related value. In FIG. 6, a solid line represents an up-shift line and a single dot line represents a downshift line.

Further, in FIG. 6, a broken line represents a determination vehicle speed V1 and a determination output torque T1 for the switching control means 50 to make a determination on the continuously variable control area and the step-variable control area. That is, the broken line in FIG. 6 represents a two determination lines. One is a predetermined high vehicle speed determination line, which forms a series of the determination vehicle speed V1 representing a predetermined high-speed running determination line for determining that the hybrid vehicle lies in the high speed running region. Other is a predetermined high-output running determination line which forms a series of the determination output torque T1 representing a predetermined high-output running determination line for determining the drive-force related value relevant to the hybrid vehicle, that is, for instance, the high output running region for the output torque $T_{OUT}$ of the automatic transmission 20 to mark the high output.

Further, as sown in a double dot line in FIG. 6 in contrast to the broken line indicated therein, a hysteresis is provided for making a determination on the step-variable shifting control region and the continuously variable shifting control region. That is, FIG. 6 represents a preliminarily stored shifting diagram (switching map and relation) for the switching control means 50 to make a regional determination on either the continuously variable control area or the step-variable control area, based on parameters with the vehicle speed V and the output torque $T_{OUT}$ covering the determination vehicle speed V1 and the determination output torque T1. In addition, the memory means 56 may preliminarily store the shifting map, inclusive of such a shifting diagram. Moreover, the shifting diagram may be of the type that includes at least one of the determination vehicle speed V1 and the determination output torque T1 and may include a preliminarily stored shifting diagram with a parameter taking any of the vehicle speed V and the output torque $T_{OUT}$.

The shifting diagram, the switching diagram or the drive-force source switching diagram or the like may be stored not in the map but in a determination formula for making comparison between the current vehicle speed V and the determination vehicle speed V1, and a determination formula or the like for making comparison between the output torque $T_{OUT}$ and the determination output torque T1. In such a case, the switching control means 50 places the shifting mechanism 10 in the step-variable shifting state when the vehicle condition such as, for instance, the current vehicle speed exceeds the determination vehicle speed V1. In addition, the switching control means 50 places the shifting mechanism 10 in the step-variable shifting state when the vehicle condition such as, for instance, the output torque $T_{OUT}$ of the automatic transmission 20 exceeds the determination output torque T1.

Further, a failure or defective function occurs in control equipment of an electrical system such as the electric motor or the like for rendering the differential portion 11 operative to act as the electrically controlled continuously variable transmission. For instance, a defective function occurs in equipment related to the electrical path for the first electric motor M1 to generate electric energy which in turn is converted to mechanical energy. That is, failures or defective functions, resulting from the failures or the exposure to low temperatures, are present in the first electric motor M1, the second electric motor M2, the inverter 58, the electric-storage device 60 and transmission lines or the like for electrical connection of these component parts. Under the vehicle condition encountered with such defective states, even if the vehicle condition lies in the continuously variable control area, the switching control means 50 may have top priority to place the shifting mechanism 10 in the step-variable shifting state for ensuring the vehicle to continue a running state.

The above drive-force related value is a parameter corresponding to the drive force of the vehicle in one-to-one relation, which may be the drive torque or the drive force at the drive wheel 38. In addition, it may be an output torque $T_{OUT}$ of the automatic transmission 20, an engine output torque $T_E$, an acceleration value of the vehicle; an actual value such as the engine output torque $T_E$ calculated based on the operating angle of the accelerator pedal or the opening angle $\theta_{TH}$ of the throttle valve (or intake air quantity, air/fuel ratio or fuel injection amount) and the engine speed $N_E$; or an estimated value such as the engine output torque $T_E$ or required vehicle drive force calculated based on the amount of operation of the accelerator pedal by the vehicle operator or the operating angle of the throttle valve. The vehicle drive torque may be calculated based on not only the output torque $T_{OUT}$, etc., but also the ratio of a differential gear device of and the radius of the drive wheels 38, or may be directly detected by a torque sensor or the like. This is true for each of torques mentioned above.

Further, for instance, if the shifting mechanism 10 is placed in the continuously variable shifting state during the running of the vehicle at a high speed, a deterioration occurs in fuel consumption. Therefore, to address such an issue, the vehicle speed V1 is set such that the shifting mechanism 10 is placed in the step-variable shifting state during the running of the vehicle at the high speed. Furthermore, if the first electric motor M1 is configured to provide a reactive torque varying in a range covering the high output region of the engine during the running of the vehicle in a high output region, the first electric motor M1 becomes large in size. To minimize the first electric motor M1, the determination torque T1 is set to depend on the characteristic of the first electric motor M1 such that, for instance, the maximum output of electric energy being generated by the first electric motor M1 is lowered.

Figure 7:
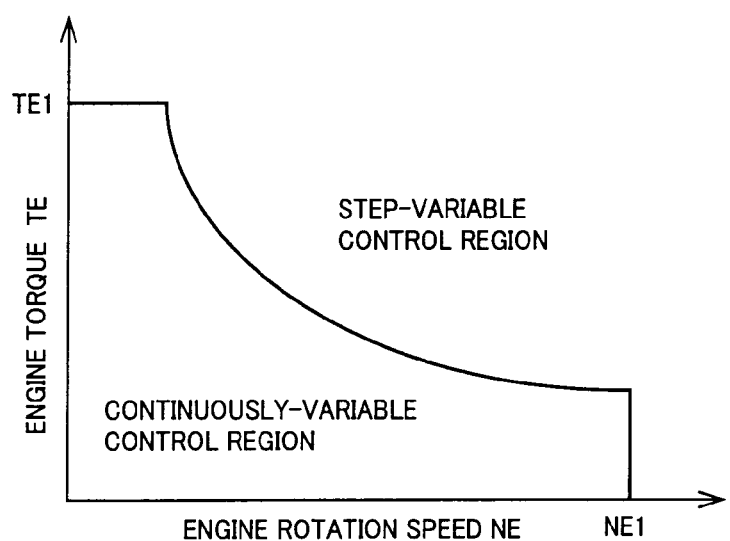
FIG. 7 is a conceptual view showing a preliminarily stored relation having a boundary line between a continuously variable control area and a step-variable control area for mapping the boundary line between the continuously variable control area and the step-variable control area shown in broken lines in FIG. 6.

FIG. 7 represents a switching diagram (switching map and relation), preliminarily stored in the memory means 56. It has an engine output line in the form of a boundary line to allow the switching control means 50 to execute the regional determination on which of the step-variable control area and the continuously variable control area is to be selected in terms of the parameters including the engine speed $N_E$ and the engine torque $T_E$. The switching control means 50 may execute the operation based on the engine speed $N_E$ and the engine torque $T_E$ by referring to the switching diagram shown in FIG. 7 in place of referring to the switching diagram shown in FIG. 6. That is, the switching control means 50 may determine whether the vehicle condition, represented with the engine speed $N_E$ and the engine torque $T_E$, is placed in the step-variable control area or the continuously variable control area. Further, FIG. 7 is a conceptual view for the broken line to be plotted as shown in FIG. 6. In other words, the broken line in FIG. 6 also represents shifting lines rewritten on the two-dimensional coordinate in terms of the parameters including the vehicle speed V and the output torque $T_{OUT}$ based on the relational diagram (map) shown in FIG. 7.

As indicated on the relation shown in FIG. 6, the step-variable control area is set to lie in the high torque region, where the output torque $T_{OUT}$ is greater than the predetermined determination output torque T1, or the high vehicle speed region where the vehicle speed V is greater than the predetermined determination vehicle speed V1. Therefore, a step-variable shift running area is effectuated in a high drive torque region, where the engine 8 operates at a relatively high torque, or a relatively high vehicle speed region of the vehicle speed. Further, a continuously variable shift running area is effectuated in a low drive torque region, where the engine 8 operates at a relatively low torque, or a relatively low vehicle speed region of the vehicle speed, that is, during a normal output region of the engine 8.

In the relation shown in FIG. 7, similarly, the step-variable shifting control region is set to lie in a high-torque region where the engine torque $T_E$ is greater than a predetermined given value TE1, a high-speed rotating region where the engine speed $N_E$ is greater than a predetermined given value NE1, or a high-output region where the engine output, calculated based on the engine torque $T_E$ and the engine speed $N_E$, is greater than a given value. Therefore, the step-variable shift running area is effectuated at a relatively high torque, a relatively high rotating-speed or a relatively high-output of the engine 8. The continuously variable shift running area is effectuated at a relatively low torque, a relatively low rotating-speed or a relatively low-output of the engine 8, that is, in the normal output region of the engine 8. The boundary line in FIG. 7 between the step-variable control area and the continuously variable control area corresponds to a high vehicle-speed determination line which forms a series of high vehicle-speed determination values and a high-output running determination line which forms a series of high-output running determination values.

With such a boundary line, the shifting mechanism 10 is placed in the continuously variable shifting state to ensure the vehicle to have fuel economy performance during the running of the vehicle at, for instance, a low/medium speed and low/medium output. In the high speed running region where an actual vehicle speed V exceeds the determination vehicle speed V1, the shifting mechanism 10 is placed in the step-variable shifting state operative to act as a step-variable transmission. In this moment, the output of the engine 8 is transferred to the drive wheels 38 mainly through a mechanical power transmitting path. This suppresses a loss in conversion between drive power and electric energy, generated when the shifting mechanism 10 is caused to act as an electrically controlled continuously variable transmission, providing improved fuel consumption. Further, during the running of the vehicle at the high output of the engine where the drive-force related value such as the output torque $T_{OUT}$ or the like exceeds the determination torque T1, the shifting mechanism 10 is placed in the step-variable shifting state acting as the step-variable transmission. In this moment, the output of the engine 8 is transferred to the drive wheels 38 mainly through the mechanical power transmitting path.

Figure 8:
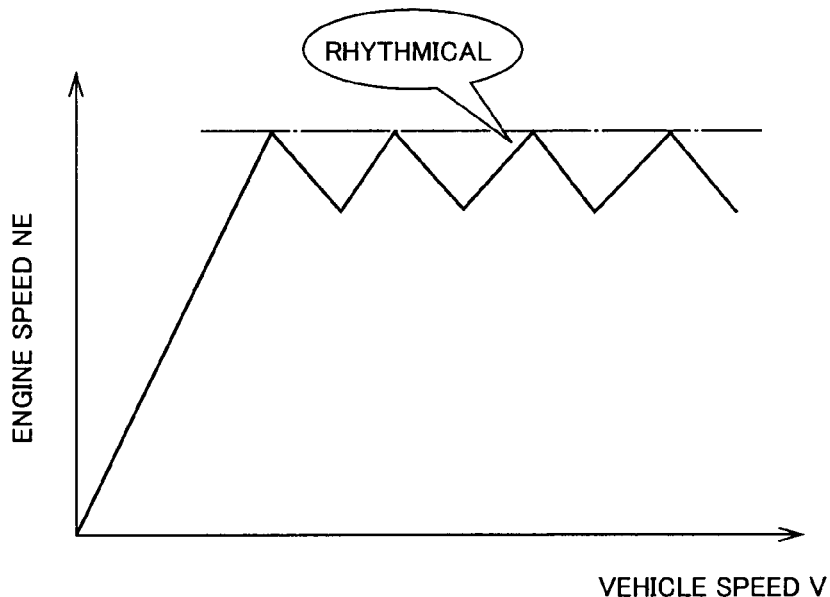
FIG. 8 is a graph showing fluctuation in an engine speed caused in upshift in a step-variable transmission.

Therefore, the electrically controlled continuously variable transmission is caused to operate in the low/medium speed running region and the low/medium output running region of the vehicle. Accordingly, this results in a reduction in the maximum value of the electric energy being generated by the first electric motor M1, that is, the electric energy being transmitted by the same. Thus, a further miniaturization can be achieved in the first electric motor M1 per se or the vehicle drive apparatus including such a component. In other words, moreover, a driver's requirement for the drive force is more important than a requirement for fuel economy during the running region of the vehicle at the high output. Therefore, the shifting mechanism 10 is switched to the step-variable shifting state (fixed shifting state) rather than the continuously variable shifting state. This allows a driver to enjoy a change in the engine speed $N_E$ resulting from the up-shifting in the step-variable automatic shift running region as shown in, for instance, FIG. 8, that is, a rhythmical change in the rotating speed $N_E$ of the engine.

Thus, with the illustrated embodiment, the differential portion 11 (shifting mechanism 10) can be selectively switched to the continuously variable shifting state and the step-variable shifting state (fixed shifting state). In particular, the switching control means 50 determines the shifting state for the differential portion 11 to be switched based on the vehicle condition, upon which the differential portion 11 is selectively switched to either the continuously variable shifting state or the step-variable shifting state. With the illustrated embodiment, further, the hybrid control means 52 effectuates either the motor running area or the engine running area depending on the vehicle condition. To this end, the engine starting and stopping control means 90 effectuates the starting or the stopping of the engine 8 to perform the switching between the engine running area and the motor running area.

When this takes place, it is conceivable that depending on the vehicle condition, the switching control means 50 executes the operation for switching the shifting state in an overlapping phase with the operation of the engine starting and stopping control means 90 for starting or stopping the engine 8. For instance, as shown by a transition "a"←→"c" on the solid line in FIG. 6, if the accelerator pedal is deeply depressed or released by an increased extent, the vehicle condition varies between the motor running area and the engine running area and, concurrently, the engine torque varies between the continuously variable control area and the step-variable control area. At this moment, the overlapping operations occur between the switching of the shifting state and the starting or the stopping of the engine 8. This results in a probability of switching shocks occurring depending on timings at which such controls are executed in conflict with each other.

During the operation to switch the shifting state, for instance, the switching clutch C0 or the switching brake B0 are coupled or uncoupled. When this takes place, a coupling-transient hydraulic pressure, an uncoupling-transient hydraulic pressure or line pressures acting as relevant source pressures are controlled depending on the input torque (or the input torque $T_{IN}$ applied to the automatic transmission 20) being applied to the differential portion 11, that is the engine torque $T_E$, for suppressing, for instance, the shocks encountered during the relevant coupling operations. So, if the switching of the shifting state and the starting or the stopping of the engine 8 is executed at the substantially same time, a need arises to execute the switching of the shifting state by considering the fluctuations in the engine torque $T_E$ caused by the starting or the stopping of the engine 8. Such control becomes complicated in operation, causing deterioration in controllability of the switching control means 50 for performing the switching of the shifting state. This results in probability with the occurrence of switching shocks.

In the illustrated embodiment, moreover, the term "multiplexing" refers to a phase in which the switching control means 50 executes the switching of the shifting state and the engine starting and stopping control means 90 executes the starting or the stopping of the engine 8 in an overlapping state.

Therefore, a basic sequence of operations are performed to execute controls so as to suppress the switching shocks resulting from the overlapping operations executed with the switching control means 50 for the switching of the shifting state and the engine starting and stopping control means 90 for the starting or the stopping of the engine 8. Such a basic sequence of control operations will be described hereunder.

Turning back to FIG. 5, simultaneous switching judge means 80 determines whether or not simultaneous switching phases occur between the operation of the switching control means 50 for switch the shifting state and the operation of the hybrid control means 52 for switching the motor running area and the engine running area, that is, the operation of the engine starting and stopping control means 90 for performing the starting or the stopping of the engine 8. That is, the simultaneous switching judge means 80 determines whether or not the switching of the shifting state and the starting or the stopping of the engine 8 is executed in the overlapping phases.

The switching control means 50 executes the operation based on the vehicle condition to determine the shifting state to be switched in the differential portion 11, that is, the shifting state of the differential portion 11 to be switched. Further, the hybrid control means 52 executes the operation based on the vehicle condition to determine the switching between the motor running area and the engine running area. With such operations being executed, if the engine starting and stopping control means 90 determines the operating state of the engine 8 to be switched, that is, if the starting or the stopping of the engine 8 is determined, the simultaneous switching judge means 80 determines that the overlapping phases occur between the operation of the switching control means 50 for effectuating the switching of shifting state and the operation of the engine starting and stopping control means 90 for the starting or the stopping of the engine 8.

For instance, the solid line B shown in FIG. 6 in transition of the points "a"→"c" represents an exemplary case where the overlapping phases occur between the switching of the shifting state and the starting or the stopping of the engine 8. During the motor running area where the shifting mechanism 10 is placed in the continuously variable shifting state and the engine 8 remains under a halted condition, if the accelerator pedal is deeply depressed, the required output torque $T_{OUT}$ increases. At this moment, the vehicle condition varies in transition of the points "a"→"c". Therefore, the switching control means 50 determines the switching of the shifting mechanism 10 from the continuously variable shifting state to the step-variable shifting state. In addition, the hybrid control means 52 determines the switching from the motor running area to the engine running area, which represents a case where the engine starting and stopping control means 90 determines the starting of the engine 8 to be effectuated. The term "output torque $T_{OUT}$", as used herein, refers to the required output torque $T_{OUT}$ that is calculated based on the accelerator-pedal displacement value Acc caused by the driver's operation to depress the accelerator pedal.

Further, the solid line B shown in FIG. 6 in transition of the points "c"→"a" shows another case where the shifting mechanism 10 is placed in the step-variable shifting state. During the engine running area where the engine 8 is under the operating condition, if the accelerator pedal is released by an increased extent, the required output torque $T_{OUT}$ decreases. At this moment, the vehicle condition varies in a path across the points "c"→"a". Then, the switching control means 50 determines the switching of the shifting mechanism 10 to be effectuated from the step-variable shifting state to the continuously variable shifting state. In addition, the hybrid control means 52 determines the engine running area to be switched to the motor running area, which represents a case where the engine starting and stopping control means 90 determines that the stopping of the engine 8 is effectuated.

The overlapping operations are executed for the operation of the switching control means 50 causing the differential portion 11 to perform the switching between the continuously variable shifting state and the step-variable shifting state, and the operation of the hybrid control means 52 causing the motor running area and the engine running area to be switched. That is, at this moment, the simultaneous switching judge means 80 determines that the operation of the switching control means 50 causing the differential portion 11 to perform the switching between the continuously variable shifting state and the step-variable shifting state is executed in overlapping phase with the operation of the engine starting and stopping control means 90 effectuating the starting or the stopping of thereof. Then, execution control means 82 executes the operation so as to prevent the switching of the shifting state and the starting or the stopping of the engine 8 from being executed in the overlapping state. That is, the execution control means 82 executes at least one of the operation for performing the switching of the shifting state and the operation for effectuating the starting or the stopping of the engine 8 such that no overlapping operations are simultaneously executed. This suppresses or avoids the occurrence of switching shocks that would occur when the overlapping operations are executed for the operation of the switching control means 50 causing the shifting state to be switched and the operation of the engine starting and stopping control means 90 causing the engine 8 to be started or stopped.

For instance, the execution control means 82 executes either the operation for the switching of the shifting state and the operation for the starting or the stopping of the engine 8, and subsequently, executes the rest of these operations. More particularly, the execution control means 82 initially causes the engine starting and stopping control means 90 to operate for the starting or the stopping of the engine 8, and then, causes the switching control means 50 to switch the shifting state. This is because the first electric motor M1 is caused to function as a starter when the engine starting and stopping control means 90 effectuates the starting of the engine 8, and the shifting mechanism 10 needs to be placed in the continuously variable shifting state so as to rapidly change the rotating speed $N_{M1}$ of the first electric motor M1. As will be apparent from FIG. 6, the shifting mechanism 10 is normally placed in the continuously variable shifting state during the motor running area. Thus, the starting of the engine 8 is effectuated in advance with the shifting mechanism 10 kept in the continuously variable shifting state. In another way of thinking, when the accelerator pedal is depressed, the motor running area is switched to the engine running area. In this moment, the required torque needs to be rapidly satisfied for improved accelerating performance. Therefore, the starting of the engine 8 is effectuated in advance.

On the contrary, for the engine running area to be switched to the motor running area, it is only necessary for the engine starting and stopping control means 90 to perform at least fuel cut-off. Thus, the execution control means 82 has no need to necessarily execute the stopping of the engine 8 in advance. That is, during the operation of the engine starting and stopping control means 90 causing the engine 8 to remain in a halted state, the execution control means 82 may sufficiently execute the stopping of the engine 8 and the switching of the shifting state in a predetermined sequence.

In the halted state of the engine 8, for instance, the execution control means 82 compels the switching control means 50 to initially effectuate the switching of the shifting state, and then, allows the engine starting and stopping control means 90 to effectuate the stopping of the engine 8. This is because during the operation of the engine starting and stopping control means 90 to stop the engine 8, the shifting mechanism 10 needs to be placed in the continuously variable shifting state for the purpose of rapidly decreasing the rotating speed $N_{M1}$ of the first electric motor M1 to cause a rapid drop in the engine speed $N_E$. As will be apparent from FIG. 6, in the running region where the shifting mechanism 10 is placed in the step-variable shifting state, the engine running area is normally effectuated. Therefore, the step-variable shifting state is switched to the continuously variable shifting state in advance, and subsequently, the stopping of the engine 8 is effectuated.

Thus, the execution control means 82 executes the operation based on the vehicle condition. That is, the execution control means 82 executes the operation based on whether the engine running area is switched to the motor running area or the motor running area is switched to the engine running area to alter a sequence of executing the starting or the stopping of the engine 8 and the switching of the shifting state, that is, for instance, an executing sequence of executing the starting or the stopping of the engine 8 and the switching of the shifting state in sequence. In an alternative, when the starting or the stopping of the engine 8 and the switching of the shifting state are executed in sequence, the execution control means 82 may perform a so-called sequence control in which the control of effectuating either one of the switching of the shifting state and the starting or the stopping of the engine 8 is completed, and then, the rest of the operations is executed.

Upon operation of the simultaneous switching judge means 80 to determine that the overlapping phases occur between the switching of the shifting state and the starting or the stopping of the engine 8, the execution control means 82 controls the sequence of executing the switching of the shifting state and the starting or the stopping of the engine 8. In this moment, torque-assist control means 86 temporarily executes torque-assisting upon compelling the hybrid control means 52 to drive the second electric motor M2 so as to assist the drive force of the engine 8.

For instance, if the accelerator pedal is depressed, the motor running area is switched to the engine running area. In this moment, a need arises for the required drive torque to be rapidly satisfied to provide improved accelerating performance. In other words, with the accelerator pedal being depressed, if a delay occurs in an increase in the output torque of the automatic transmission 20, adverse affect is caused to occur. To compensate such operation, the torque-assist control means 86 compels the hybrid control means 52 to temporarily execute torque-assisting operation.

Figure 9:
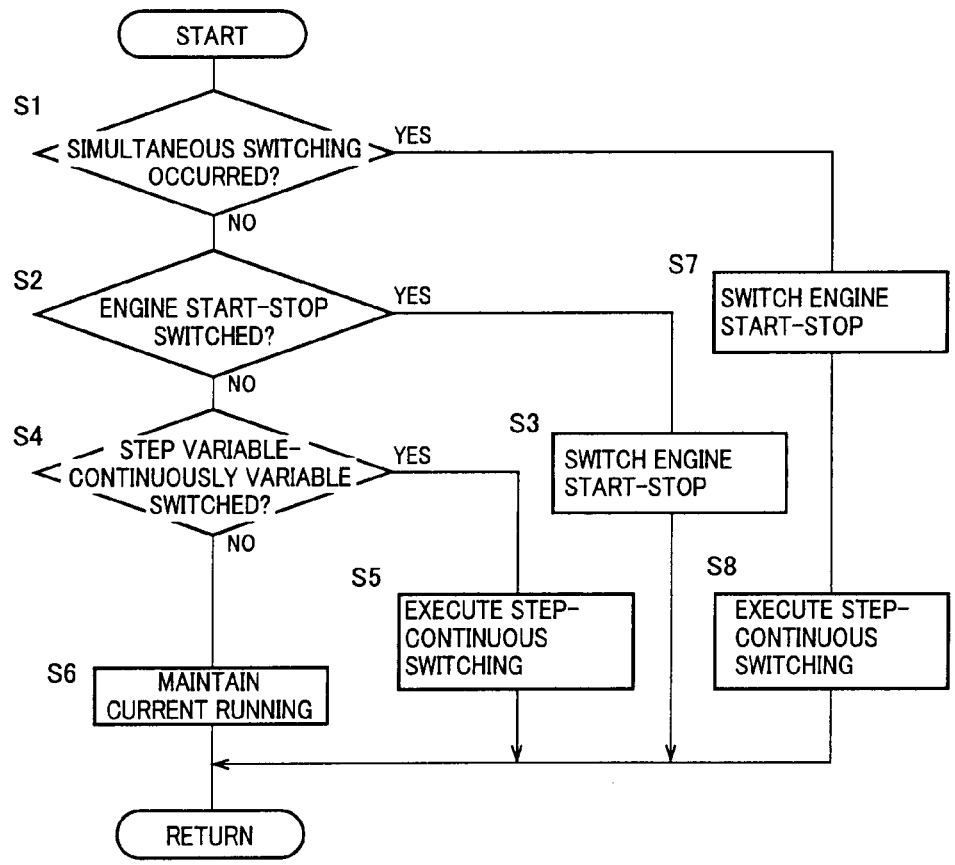
FIG. 9 is a flowchart illustrating a basic sequence of control operations of the electronic control device shown in FIG. 5, that is, a basic sequence of control operations to be executed when overlapping operations are executed for the switching of a shifting state and the starting or the stopping of an engine.
Figure 10:
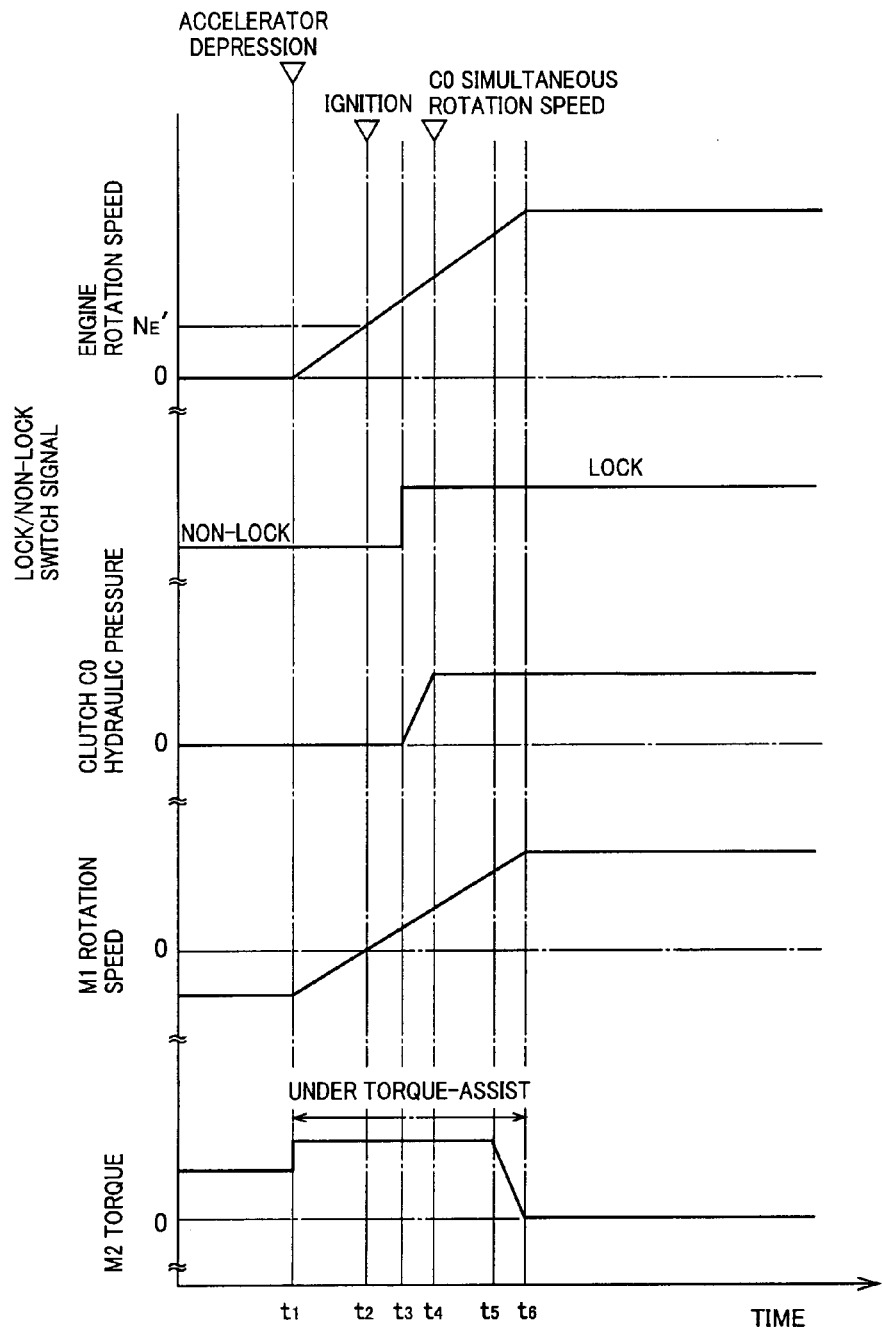
FIG. 10 is a timing chart explaining the control operations shown in the flowchart of FIG. 9. It represents an example wherein a determination is made that substantially overlapping phases occur between the operation of switching the motor running area to the engine running area during the motor running area and the operation of a differential portion for switching a continuously variable shifting state to a step-variable shifting state.

FIG. 9 is a flowchart explaining an essence of control operations to be executed by the electronic control device 40, that is, a basic sequence of control operations to be executed during the occurrence of overlapping operations between the switching of the shifting state and the starting or the stopping of the engine 8. The control operations are repeatedly executed on extremely short cycle times in the order of, for instance, approximately several milliseconds to several tens milliseconds. Further, FIG. 10 is a timing chart illustrating the basic sequence of control operations shown in the flowchart of FIG. 9. The timing chart represents an exemplary case where judgment is made that the motor running area is switched to the engine running area in a nearly overlapping phase with the operation of the differential portion 11 to switch the continuously variable shifting state to the step-variable shifting state. For instance, as shown by the solid line B in FIG. 6 on transition across the points "a"→"c", the simultaneous switching judge in FIG. 10 is supposed to be involved in the vehicle condition under which the accelerator pedal is deeply depressed during the motor running area.

First, in step (hereinafter abbreviated as "S") S1 corresponding to the simultaneous switching judge means 80, the operation is executed to determine whether or not the simultaneous switching occurs between the operation of the switching control means 50 causing the switching of the shifting state and the operation of the engine starting and stopping control means 90 causing the starting or the stopping of the engine 8. Time instant i.e., timing $t_1$ in FIG. 10 indicates that the accelerator pedal is deeply depressed and the required output torque $T_{OUT}$ remarkably increases. In this moment, the vehicle condition varies in transition across the points "a"→"c" in FIG. 6. This results in judgment that there is the switching of the shifting mechanism 10 from the continuously variable shifting state (non-locked state) to the step-variable shifting state (locked state) caused by the switching clutch C0 being coupled, and that the motor running area is switched to the engine running area. This represents that the starting of the engine 8 is determined and judgment is made that the overlapping operations occur between the switching to the locked state and the starting of the engine 8.

If a judgment in S1 is negative, the flow proceeds to next S2 corresponding to the engine starting and stopping control means 90. In this moment, the hybrid control means 52 executes the operation based on the vehicle condition to find the motor running area or the engine running area. On the ground of such judgment, a judgment is made whether the starting or the stopping of the engine 8 is to be executed not in multiplexing phases but in a single phase. If the judgment in S2 is positive, then, the flow proceeds to next S3 corresponding to the engine starting and stopping control means 90. In this moment, either the starting or the stopping of the engine 8 is executed to establish the engine running area or the motor running area determined in S2, after which the current routine is terminated.

If the judgment in S2 is negative, the flow proceeds to S4 corresponding to the switching control means 50. In this moment, a determination is made based on the vehicle condition to find whether or not the switching of the shifting state occurs in the differential portion 11 not in the multiplexing phases but in the single phase. If a determination in S4 is positive, the flow proceeds to next S5 corresponding to the switching control means 50. In this moment, a command is output to the hydraulic control circuit 42 for switching the coupling/uncoupling state of the switching clutch C0 or the switching brake B0 so as to place the differential portion 11 in the shifting state determined in S4. Thereafter, the current routine is terminated. In contrast, if the determination in S4 is negative, the flow proceeds to S6, where the vehicle is sustained in the current running condition, and the current routine is terminated.

If the judgment in S1 is positive, the flow proceeds to S7 corresponding to the execution control means 82. In this moment, the engine starting and stopping control means 90 effectuates the starting or the stopping of the engine 8 in advance. Then, in S8 corresponding to the execution control means 82, the switching control means 50 effectuates the switching of the shifting state.

Time instants $t_1$ and $t_2$, shown in FIG. 10, represents that in effectuating the starting of the engine 8 under the continuously variable shifting state in priority to the control of switching the continuously variable shifting state (non-locked state) to the step-variable shifting state (locked state) by coupling the switching clutch C0, the first electric motor M1 is caused to function as a starter to rapidly change the rotating speed $N_{M1}$ of first electric motor M1. This suppresses vibrations occurring at a startup of the engine 8. As designated at time instant $T_2$, the engine 8 is ignited at a given engine speed $N_E'$. After the engine 8 has started up, a command is output to the hydraulic control circuit 42, as designated at time instant $t_3$, for coupling the switching clutch C0. Therefore, hydraulic pressure is caused to rise so as to couple the switching clutch C0 during a period from time instants $t_3$ to $t_4$. At time instant $t_4$, the coupling of the switching clutch C0 is completed, causing the engine speed $N_E$ and the first electric motor rotating speed $N_{M1}$ to be brought into synchronized rotation.

Further, due to the depression of the accelerator pedal, the simultaneous switching occurs between the switching of the shifting state and the starting of the engine 8. In this moment, the starting of the engine 8 and the switching of the shifting state are effectuated under sequence control. When this takes place, if the output torque of the automatic transmission 20 increases in delay even when the accelerator pedal remains under a depressed condition, an adverse effect arises. To compensate such an adverse affect, with the illustrated embodiment shown in FIG. 10, the torque-assisting is temporarily executed using the second electric motor M2 under the sequence control being executed.

Here, if the simultaneous switching states occur, the stopping of the engine 8 is effectuated for switching the engine running area to the motor running area. In this moment, it is sufficed for at least fuel cut-off to be executed in operation. Therefore, no need arises for the stopping of the engine 8 to be necessarily effectuated in S7 in advance. For instance, if the accelerator pedal is released, the simultaneous switching states occur between the switching of the shifting state and the stopping of the engine 8. When this takes place, in FIG. 9, the judgment in S1 is positive. Then, the flow proceeds to S7 corresponding to the execution control means 82. In this moment, the switching control means 50 executes the switching of the shifting state in advance. The, the flow proceeds to S8 corresponding to the execution control means 82. In this moment, the engine starting and stopping control means 90 effectuates the stopping of the engine 8.

Figure 11:
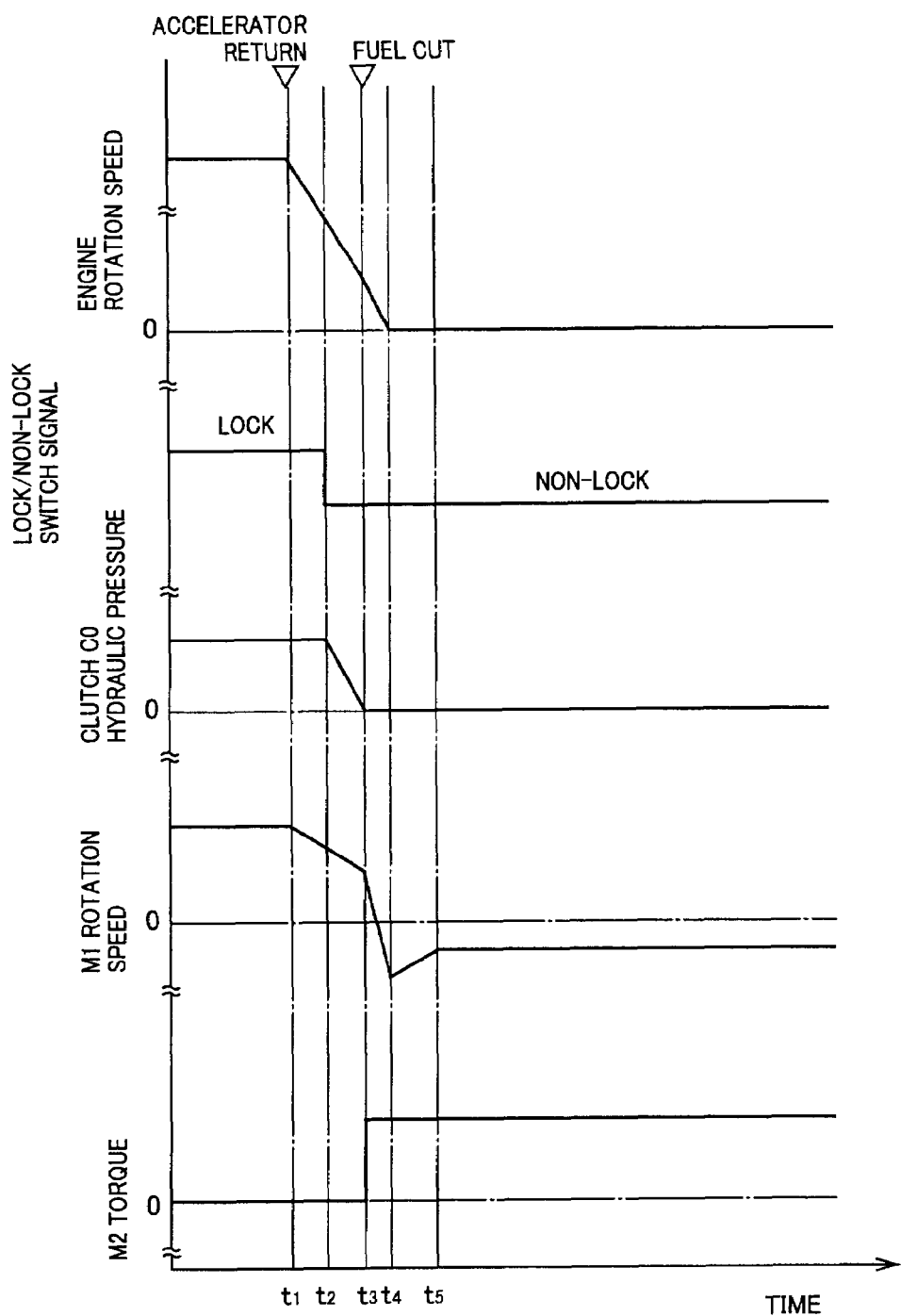
FIG. 11 is a timing chart explaining a basic sequence of control operations, executed on a flowchart (not shown) with the control operations altered in the flowchart, shown in FIG. 9, so as to execute the switching of a shifting state in S7 while executing the starting or the stopping of the engine in S8. It represents an example wherein the determination is made that the substantially overlapping phases occur between the operation of switching the engine running area to the motor running area in the engine running area and the operation of the differential portion for switching step-variable shifting state to the continuously variable shifting state.

FIG. 11 is a timing chart explaining a basic sequence of control operations to be executed in a flowchart (not shown), corresponding to an alternative of the flowchart shown in FIG. 9, such that in S7 in the flow chart shown in FIG. 9, the switching of the shifting state is executed and, then in S8, the starting or the stopping of the engine 8 is executed. This represents an exemplary case where a determination is made that the substantially simultaneous switching states occur between the operation of switching the engine running area to the motor running area and the operation of the differential portion 11 for switching the step-variable shifting state to the continuously variable shifting state. For instance, the simultaneous switching judgment state, shown in FIG. 11, is deemed to lie in a vehicle condition where as designated by a transition with the points "c"→"a" on the solid line B in FIG. 6, the accelerator pedal is released to an increased extent in the engine running area.

The time instant $t_1$ in FIG. 11 represents an exemplary case where the accelerator pedal is released to the increased extent to cause the required output torque $T_{OUT}$ to decrease. In this case, the vehicle condition varies in manner as shown by, for instance, by a transition with the points "c"→"a" in FIG. 6. When this takes place, a determination is made that the shifting mechanism 10 is switched from the step-variable shifting state (locked state), caused by the switching clutch C0 being coupled, to the continuously variable shifting state (non-locked state). In addition, a determination is made that the engine running area is switched to the motor running area. This allows a determination to be made that the engine 8 has stopped. Thus, a determination is made that the overlapping states occur between the switching from the locked state to the non-locked state and the stopping of the engine 8.

Further, a time instant $t_2$ represents that in order to switch the step-variable shifting state (locked state), caused by the switching clutch C0 being coupled, to the continuously variable shifting state (non-locked state) in priority to the stopping of the engine 8, a command is output to the hydraulic control circuit 42 for uncoupling the switching clutch C0. During a period from time instants $t_2$ to $t_3$, hydraulic pressure is lowered so as to uncouple the switching clutch C0. At time instant $t_3$, the uncoupling of the switching clutch C0 is completed and the fuel cut-off is executed, thereby stopping the engine 8. As designated by a time interval from $t_3$ and $t_4$, the rotating speed $N_{M1}$ of the first electric motor M1 rapidly decreases, immediately lowering the engine speed $N_E$ to zero or nearly zero. This suppresses the occurrence of vibration caused when the engine rotation ceases at substantially zero. The illustrated embodiment, shown in FIG. 11, represents a phase in which the engine running area is switched to the motor running area. Thus, after time instant $t_3$, the second electric motor M2 is driven to provide toque after the engine 8 has stopped.

As set forth above, with the illustrated embodiment, if the overlapping phases occur between the operation of the switching control means 50 causing the differential portion 11 (power distributing mechanism 16) to effectuate the switching of the shifting state for selectively switching the continuously variable shifting state to the step-variable shifting state, and the operation of the engine starting and stopping control means 90 effectuating the starting or the stopping of the engine 8, the execution control means 82 executes either one of the switching of the shifting state and the starting or the stopping of the engine 8. This suppresses the occurrence of switching shocks that would otherwise occur when the switching of the shifting state and the starting or the stopping of the engine 8 are executed in overlapping phases.

For instance, if the switching of the shifting state and the starting or the stopping of the engine 8 is executed in the overlapping phases, the engine torque $T_E$ varies due to the starting or the stopping of the engine 8. Thus, it is conceived that the operation of the switching control means 50 is adversely affected to cause deterioration to occur in switching controllability of the shifting state with the resultant occurrence of switching shocks. In a vehicle condition where the motor running area is switched to the engine running area, that is, a vehicle condition when the engine is started up, the execution control means 82 effectuates the starting of the engine 8 in advance. Thereafter, the switching of the shifting state is effectuated. This avoids the overlapping operations from being executed for the switching of the shifting state and the starting of the engine 8. In addition, each control is executed in a single step. These suppress the occurrence of switching shocks. In an alternative, the starting of the engine 8 is effectuated in advance, which enables the required drive torque to be rapidly satisfied, providing improved accelerating performance.

Next, another embodiment of the present invention will be described. Here, the same component parts as those of the embodiment set forth above bear like reference numerals in the following description to omit redundant description.

SECOND EMBODIMENT

With the present embodiment, the shifting mechanism 10 includes the automatic transmission 20. The step variable shifting control means 54 allows the automatic transmission 20 to execute the gear shifting depending on the vehicle condition. It is conceivable that depending on the vehicle condition, the operation of the switching control means 50 for switching the shifting state, the operation of the engine starting and stopping control means 90 for effectuating the starting or the stopping of the engine 8, and in addition thereto, the operation for the step variable shifting control means 54 for causing the automatic transmission 20 to perform the gear shifting, are executed in overlapping phases.

As shown by a transition with points "d"←→"e" on a solid line C in FIG. 6, for instance, if the accelerator pedal is deeply depressed or released to an increased extent, the vehicle condition varies between the motor running area and the engine running area, and simultaneously encounters a change between the continuously variable control area and the step-variable control area. In addition, a crossover takes place in the shifting lines (up-shifting lines and down shifting lines). In such a state, the switching of the shifting state, the starting or the stopping of the engine 8 and the gear shifting of the automatic transmission 20 are executed in overlapping phases.

During the operation of the automatic transmission 20 for gear shifting, for instance, a coupling-transient hydraulic pressure, an uncoupling-transient hydraulic pressure or the related line pressure acting as a source pressure for the hydraulic-type frictionally coupling devices (clutch C and brake B) of the automatic transmission 20 are controlled depending on, for instance, the input torque $T_{IN}$ applied to the automatic transmission 20, that is, the engine torque $T_E$. This is for suppressing shocks occurring during the gear shifting of the automatic transmission 20. Then, the switching of the shifting state and the starting or the stopping of the engine 8 are executed at the substantially same time in an overlapping phase with the gear shifting of the automatic transmission 20. This needs to execute the gear shifting of the automatic transmission 20 with the account taking for fluctuations, etc., of the input torque $T_{IN}$ of the automatic transmission 20 caused by the switching of the shifting state and the starting or the stopping of the engine 8. In addition, such operations become complicated in control, resulting in a probability for switching shocks to occur.

Moreover, as used herein, the term "multiplexing" defined above involves a case wherein the switching of the shifting state and the starting or the stopping of the engine 8 is executed in the overlapping phases and, in addition thereto, the step variable shifting control means 54 causes the automatic transmission 20 to execute the gear shifting in an overlapping phase with the above operations.

Therefore, in place of the illustrated embodiment described above or in addition thereto, the simultaneous switching judge means 80 determines whether or not simultaneous switching states occur among the switching of the shifting state, the switching between the motor running area and the engine running area, and the operation of the step variable shifting control means 54 causing the gear shifting in the automatic transmission 20. That is, a judgment is made whether or not the shifting of the shifting state, the starting or the stopping of the engine 8 and the gear shifting of the automatic transmission 20 are executed in overlapping phases.

For instance, the switching control means 50 determined the switching of the shifting state based on the vehicle condition. The hybrid control means 52 determines that the motor running area is switched to the engine running area based on the vehicle condition. These cause the engine starting and stopping control means 90 to determine the starting or the stopping of the engine 8, and the step variable shifting control means 54 to determine the gear shifting of the automatic transmission 20 based on the vehicle condition. Under such circumstances, the simultaneous switching judge means 80 determines that the overlapping states occur among the operation of the switching control means 50 for the switching of the shifting state, the operation of the engine starting and stopping control means 90 for the starting or the stopping of the engine 8, and the operation of the step variable shifting control means 54 for the gear shifting of the automatic transmission 20.

For instance, a transition with points "d"→"e" plotted on a solid line C shown in FIG. 6 represents an exemplary case where the overlapping states occur among the switching of the shifting state, the starting or the stopping of the engine 8 and the gear shifting of the automatic transmission 20. In the motor running area where the shifting mechanism 10 is placed in the continuously variable shifting state and the engine 8 remains in the halted condition, if the accelerator pedal is deeply depressed, the required output torque $T_{OUT}$ increases. In this moment, the vehicle condition varies in the transition with the points "d"→"e". This causes the switching control means 50 to determine that the shifting mechanism 10 is switched from the continuously variable shifting state to the step-variable shifting state. In addition, the hybrid control means 52 determines that the motor running area is switched to the engine running area. This causes the engine starting and stopping control means 90 to determine the starting of the engine 8 and the step variable shifting control means 54 to determine a downshift in a 2nd gear→1st gear.

Similarly, further, a transition with the points "e"→"d" on the solid line C shown in FIG. 6 represents another case. That is, in the engine running area where the shifting mechanism 10 is placed in the step-variable variable shifting state and the engine 8 remains under the operating condition, if the accelerator pedal is released to an increased extent, the required output torque $T_{OUT}$ decreases. In this moment, the vehicle condition varies in the transition with the points "e"→"d". This causes the switching control means 50 that the shifting mechanism 10 is switched from the step-variable shifting state to the continuously variable shifting state. In addition, the hybrid control means 52 determines that the engine running area is switched to the motor running area. This causes the engine starting and stopping control means 90 to determine the stopping of the engine 8 and the step variable shifting control means 54 to determine an up-shift in a 1st gear→2nd gear.

The overlapping states occur among the operation of the switching control means 50 for the switching of the shifting state, the operation of the engine starting and stopping control means 90 for the starting or the stopping of the engine 8, and in addition thereto, the operation of the step variable shifting control means 54 for the gear shifting of the automatic transmission 20. That is, in such overlapping states, the simultaneous switching judge means 80 determines that the operation of the switching control means 50 for the switching of the shifting state, the operation of the engine starting and stopping control means 90 for the starting or the stopping of the engine 8 and the operation of the step variable shifting control means 54 for the gear shifting in the automatic transmission 20 are executed in the overlapping phases. In this moment, in place of the illustrated embodiment described above or in addition thereto, the execution control means 82 allows at least one of the switching of the shifting state, the starting or the stopping of the engine 8 and the gear shifting of the automatic transmission 20 to be executed.

Thus, no overlapping operations are executed for the switching of the shifting state, the starting or the stopping of the engine 8 and the gear shifting of the automatic transmission 20. This suppresses or avoids the occurrence of switching shocks resulting from the overlapping operations executed by the switching control means 50 for the shifting state, the engine starting and stopping control means 90 for the starting or the stopping of the engine and the step variable shifting control means 54 for the automatic transmission 20 to effectuate the gear shifting.

For instance, the execution control means 82 executes either one of the switching of the shifting state and the starting or the stopping of the engine 8, executes the other one of the operations and executes the rest of the operations. In place of the illustrated embodiment or in addition thereto, the execution control means 82 alters a sequence of operations based on the vehicle condition. More particularly, a sequence of executing the starting or the stopping of the engine 8 and the switching of the shifting state is altered based on whether the engine running area is switched to the motor running area or the motor running area is switched to the engine running area. In addition, a sequence of executing the starting or the stopping of the engine 8, the switching of the shifting state and the gear shifting of the automatic transmission 20 is altered based on the vehicle condition. That is, for instance, the execution control means 82 alters a sequence in which the starting or the stopping of the engine 8, the switching of the shifting state and the gear shifting of the automatic transmission 20 are executed in sequence.

For instance, during the operation of the engine starting and stopping control means 90 for effectuating the starting of the engine 8, of course, the starting of the engine 8 is executed in priority to the switching of the shifting state in the same manner as mentioned above. During such operation, the engine starting and stopping control means 90 takes top priority to execute the starting of the engine 8 in priority to the gear shifting of the automatic transmission 20 so as to immediately satisfy the required drive torque.

The simultaneous switching judge means 80 determines that the overlapping states occur among the switching of the shifting state, the starting or the stopping of the engine 8 and the gear shifting of the automatic transmission 20. In this moment, the execution control means 82 controls the sequence of executing the switching of the shifting state, the starting or the stopping of the engine 8 and the gear shifting of the automatic transmission 20. In place of the illustrated embodiment or in addition thereto, the torque-assist control means 86 causes the hybrid control means 52 to drive the second electric motor M2 for temporarily executing the torque-assisting operation to assist the drive force of the engine 8.

In the same manner as set forth above, for instance, if the accelerator pedal is depressed, the motor running area is switched to the engine running area. In this moment, the torque-assist control means 86 allows the hybrid control means 52 to temporarily execute the torque-assisting operation.

Figure 12:
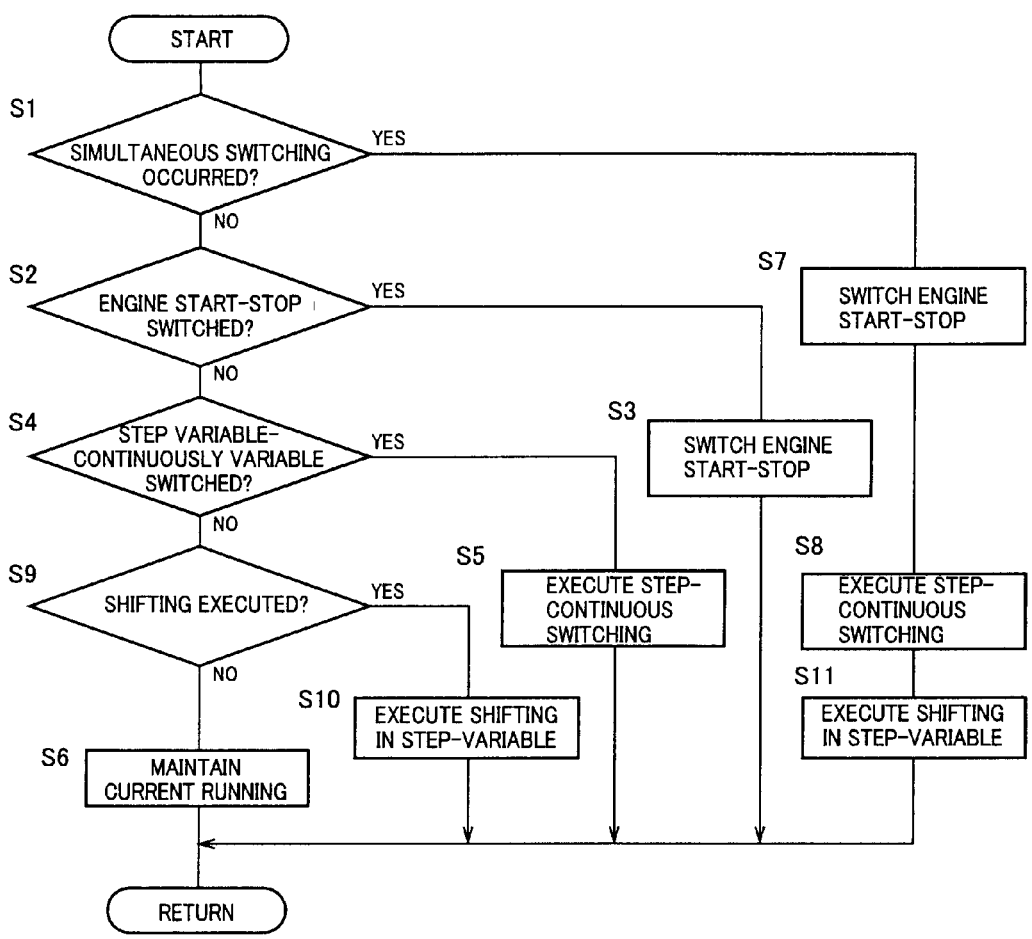
FIG. 12 is a flowchart explaining a basic sequence of control operations to be executed by the electronic control device shown in FIG. 5, that is, a basic sequence of control operations to be executed when the overlapping operations are executed for the switching of the shifting state, the starting or the stopping of the engine and the gear shifting in the automatic transmission, which is a view corresponding to the timing chart shown in FIG. 9.

FIG. 12 is a flowchart for illustrating an essence of a basic sequence of control operations to be executed by the electronic control device 40, that is, a basic sequence of performing control operations when the overlapping operations occur among the switching of the shifting state, the starting or the stopping of the engine 8 and the gear shifting of the automatic transmission 20. These operations are repeatedly executed on extremely short cycle times in the order of, for instance, approximately several milliseconds to several tens milliseconds. Further, FIG. 12 is a view corresponding to the flowchart shown in FIG. 9 but mainly differs therefrom in that the basic sequence includes S9 to S11 to be executed for the determination and processing related to the gear shifting of the automatic transmission 20.

Figure 13:
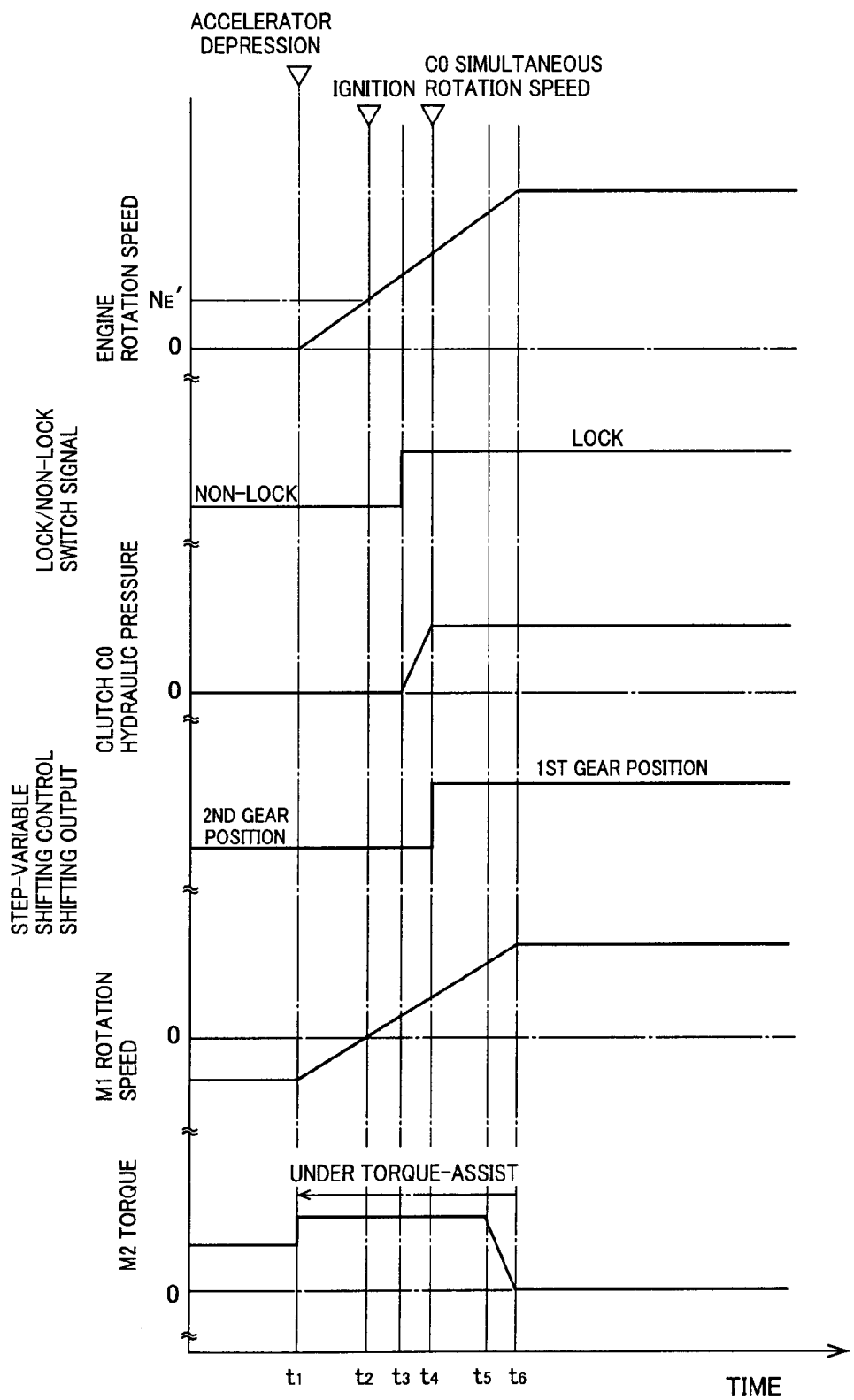
FIG. 13 is a timing chart, explaining a basic sequence of control operations shown in a flowchart of FIG. 12. It represents an example wherein the determination is made that the substantially overlapping phases occur among the operation of switching the motor running area to the engine running area during the motor running area, the operation of the differential portion for switching continuously variable shifting state to the step-variable shifting state and a downshift in the automatic transmission, which is a view corresponding to the timing chart shown in FIG. 10.

FIG. 13 is a timing chart explaining the basic sequence of control operations shown in the flowchart of FIG. 12. This presents an exemplary case where a judgment is made that the substantially simultaneous operations occur among the switching from the motor running area to the engine running area, the operation of the differential portion 11 causing the switching from the continuously variable shifting state to the step-variable shifting state and the down-shifting of the automatic transmission 20. For instance, the simultaneous switching judgment is supposed to lie in the vehicle condition where, as shown by the transition with the points "d"→"e" on the solid line C in FIG. 6, the accelerator pedal is deeply depressed in the motor running area. FIG. 13 is a view corresponding to the flowchart shown in FIG. 10 and differs from that of FIG. 10 mainly in that the flowchart of FIG. 13 additionally includes a signal output related to the gear shifting of the automatic transmission 20.

A detailed description will be given below with reference to FIGS. 12 and 13 with attention focused on points differing from those of FIGS. 9 and 10 with the rest of the descriptions being omitted. First, in S1 corresponding to the simultaneous switching judge means 80, a determination is made whether or not the simultaneous switching states occur among the operation of the switching control means 50 for the switching of the shifting state, the operation of the engine starting and stopping control means 90 for the starting or the stopping of the engine 8, and the operation of the step variable shifting control means 54 for the gear shifting of the automatic transmission 20. Time instant $t_1$ in FIG. 13 represents a case where the accelerator pedal is deeply depressed and the required output torque $T_{OUT}$ increases. In this movement, a vehicle condition varies in manner as shown by, for instance, the transition with the points "d"→"e" in FIG. 6. Therefore, a determination is made that the shifting mechanism 10 is switched from the continuously variable shifting state (non-locked state) to the step-variable shifting state (locked state) caused by the switching clutch C0 being coupled. In addition, a determination is made that the motor running area is switched to the engine running area, which allows the starting of the engine 8 to be determined. Further, a determination is made that a downshift occurs in the automatic transmission 20 for a 2nd gear→1st gear. Thus, a determination is made that the overlapping states occur in operation between the switching from the non-locked state to the locked state and the downshifting of the automatic transmission 20.

Further, if a judgment in S4 is negative, the flow proceeds to S9 corresponding to the engine starting and stopping control means 90. In this moment, a determine is made based on the vehicle condition whether to execute the gear shifting of the automatic transmission 20 not in multiplexing phases but in a single phase. That is, a determination is made to find which of the gear position is to be selected with the automatic transmission 20. If a determination in S9 is positive, the flow proceeds to S10 corresponding to the step variable shifting control means 54. In this moment, a command (shifting output command) is output to the hydraulic control circuit 42 for coupling/uncoupling the hydraulic-type frictionally coupling devices so as to establish the gear position in accordance with the operation Table, shown in for instance FIG. 2, such that the gear position determined in S9 is obtained. Subsequently, the current routine is completed. On the contrary, if the determination in S9 is negative, then in S6, the current vehicle running condition is sustained, upon which the current routine is terminated.

If the determination in S1 is positive, the flow proceeds to S7 corresponding to the execution control means 82. In this moment, the engine starting and stopping control means 90 takes top priority to execute the starting or the stopping of the engine 8. Then, the flow proceeds to S8 corresponding to the execution control means 82. In this moment, the switching control means 50 executes the switching of the shifting state. Thereafter, the flow proceeds to S11 corresponding to the execution control means 82. In this moment, the step variable shifting control means 54 causes the automatic transmission 20 to execute the gear shifting.

A time interval from $t_1$ to $t_2$ in FIG. 13 represents that the start-up of the engine 8 is initiated during the continuously variable shifting state in priority to executing the control of switching the continuously variable shifting state (non-locked condition) to the step-variable shifting state (locked state), caused by the switching clutch C0 being coupled, and the downshifting in the automatic transmission 20 for 2nd→1st gear position. During such control, the first electric motor M1 is caused to function as a starter to rapidly change the rotating speed $N_{M1}$ of the first electric motor M1. This suppresses the vibrations occurring at the startup of the engine 8. In addition, as designated at the time instant t2, the engine 8 is ignited at a given engine speed $N_E'$.

After the engine 8 has started up, as designated at time instant t3, a command is output to the hydraulic control circuit 42 for coupling the switching clutch C0. During a time interval from time instants t3 to t4, a hydraulic pressure is caused to increase so as to couple the switching clutch C0. As designated at time instant t4, the coupling of the switching clutch C0 is completed. In this moment, the engine speed $N_E$, the rotating speed $N_{M1}$ of the first electric motor M1 and the rotating speed of the transmitting member 18 are brought into synchronized rotation. As viewed from the input side of the automatic transmission 20, such synchronized rotation causes the input rotating speed (=the rotating speed of the transmitting member 18) of the automatic transmission 20 is fixed to the engine speed $N_E$.

Consecutively, as indicated at the same time instant t4, a command (gear-shift output command) is output to the hydraulic control circuit 42 for executing the downshift in 2nd-1st, that is, for coupling/uncoupling the hydraulic-type frictionally coupling devices so as to establish the first gear position. When this takes place, the two control systems are not executed at the substantially same time for the switching of the shifting state in the differential portion 11 and the gear shifting in the automatic transmission 20. This makes it easy to perform those operations. In addition, during the gear shifting in the automatic transmission 20, the engine speed $N_E$, the rotating speed $N_{M1}$ of the first electric motor M1 and the rotating speed of the transmitting member 18 are synchronized in rotation. Therefore, the engine speed $N_E$, normally varying in rotation with the gear shifting of the automatic transmission 20 in the course therewith during the locked state, may be varied in matching to variation in the rotating speed of the transmitting member 18 uniquely determined with the vehicle speed V and the gear ratio γ of the automatic transmission 20. This allows the automatic transmission 20 to immediately perform the gear shifting.

Further, if the accelerator pedal is depressed, the simultaneous switching states occur among the switching of the shifting state, the starting or the stopping of the engine 8 and the gear shifting of the automatic transmission 20. In this moment, the sequence control is executed for the starting of the engine 8, the switching of the shifting state and the gear shifting of the automatic transmission 20. When this takes place, if the output torque of the automatic transmission 20 increases in delay even with the accelerator pedal being depressed, then, adverse effect occurs. To compensate such an adverse affect, with the illustrated embodiment shown in FIG. 13, the torque-assisting effect is temporarily executed using the second electric motor M2 during the sequence control being executed as shown in a period from the time instants t1 to t6 in the same manner as that of the illustrated embodiment shown in FIG. 10.

Under a situation where the simultaneous switching states occur, the stopping the engine 8 is initiated for the engine running area to be switched to the motor running area. In such a case, at least the fuel cut-off is sufficed to occur in operation. Therefore, no need arises for the operation in S7 to be necessarily executed in advance for the stopping of the engine 8. In FIG. 12, for instance, if the accelerator pedal is released, the simultaneous switching states occur among the switching of the shifting state, the stopping of the engine 8 and the gear shifting of the automatic transmission 20. If the determination in S1 is positive, the flow proceeds to S7 corresponding to the execution control means 82. In this moment, the switching control means 50 allows the switching of the shifting state to be effectuated in advance. Then, the flow proceeds to S8 corresponding to the execution control means 82, where the engine starting and stopping control means 90 executes the stopping of the engine 8. Then, the flow proceeds to S11 corresponding to the execution control means 82, where the step variable shifting control means 54 allows the automatic transmission 20 to perform the gear shifting.

Figure 14:
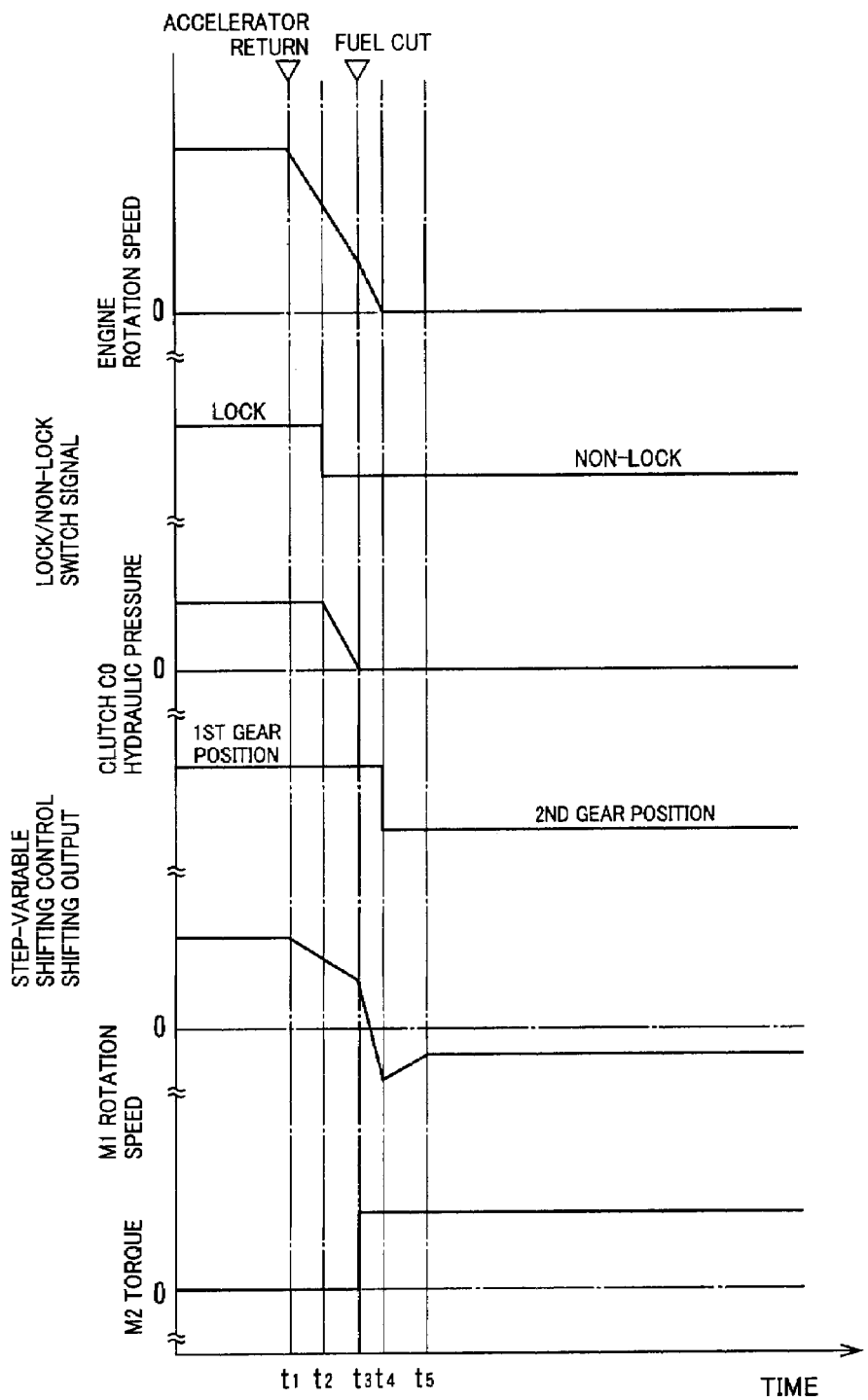
FIG. 14 is a timing chart, explaining a basic sequence of control operations, executed on a flowchart (not shown) with the control operations altered in the flowchart, shown in FIG. 12, so as to execute the switching of the shifting state in S7 while executing the starting or the stopping of the engine in S8. It represents an example wherein the determination is made that the substantially overlapping phases occur among the operation of switching the engine running area to the motor running area in the engine running area, the operation of the differential portion for switching step-variable shifting state to the continuously variable shifting state, and the upshift in the automatic transmission, which is a view corresponding to the timing chart shown in FIG. 11.

FIG. 14 is a timing chart explaining a basic sequence of control operations to be executed in a flowchart (not shown), corresponding to an alternative of the flowchart shown in FIG. 12, such that in S7 in the flow chart shown in FIG. 12, the switching of the shifting state is executed, and then in S8, the starting or the stopping of the engine 8 is executed. This represents an exemplary case where a determination is made that the substantially simultaneous switching states occur among the operation of switching the engine running area to the motor running area, the operation of the differential portion 11 for switching the step-variable shifting state to the continuously variable shifting state, and the operation of the automatic transmission 20 for up-shifting. For instance, the simultaneous switching judgment state, shown in FIG. 14, is deemed to lie in a vehicle condition where as designated by a transition with the points "e"→"d" on the solid line C in FIG. 6, the accelerator pedal is released to an increased extent in the engine running area. FIG. 14 is a view corresponding to the timing chart shown in FIG. 11 and mainly differs from FIG. 11 in that a signal output, related to the gear shifting of the automatic transmission 20, is added.

A time instant $t_1$ in FIG. 14 indicates that the accelerator pedal is released to the increased extent. In this moment, the required output torque $T_{OUT}$ decreases and the vehicle condition varies in a manner as shown by, for instance, by a transition with the points "e"→"d" in FIG. 6. Thus, a determination is made that the shifting mechanism 10 is switched from the step-variable shifting state (locked state), caused by the switching clutch C0 being coupled, to the continuously variable shifting state (non-locked state). In addition, a determination is made that the engine running area is switched to the motor running area, which allows a determination to be made that the engine 8 has stopped. In addition, a determination is made that an up-shifting is initiated in the automatic transmission 20 for 1st-2nd gear position. Thus, a determination is made that the overlapping phases occur among the switching to the non-locked state, the stopping of the engine 8 and the up-shifting of the automatic transmission 20.

Further, a time instant $t_2$ represents that in order to switch the step-variable shifting state (locked state), caused by the switching clutch C0 being coupled, to the continuously variable shifting state (non-locked state) in priority to the stopping of the engine 8 and the up-shifting of the automatic transmission 20, a command is output to the hydraulic control circuit 42 for uncoupling the switching clutch C0. As designated by a time period from time instants $t_2$ to $t_3$, a hydraulic pressure is lowered so as to uncouple the switching clutch C0. At time instant $t_3$, the uncoupling of the switching clutch C0 is completed. Upon viewing the automatic transmission 20 from an input side thereof, no input rotating speed (=the rotating speed of the transmitting member 18) of the automatic transmission 20 is fixed to the engine speed $N_E$.

In addition, as designated at the same time instant t3, the fuel cut-off is executed to cause the engine 8 to stop. During a time interval from $t_3$ to $t_4$, in the continuously variable shifting state, the rotating speed $N_{M1}$ of the first electric motor M1 is rapidly lowered to immediately decrease the engine speed $N_E$ to zero or nearly zero with no binding from the rotational speed of the transmitting member 18 uniquely determined with the vehicle speed V and the speed ratio γ of the automatic transmission 20. This suppresses the vibration caused during the engine rotation being halted.

As designated at a time instant t4, consecutively, a command (gear shifting output command) is output to the hydraulic control circuit 42 for executing the up-shifting in a 1st-2nd gear position, that is, for coupling and/or uncoupling the hydraulic-type frictionally coupling devices so as to establish a 2nd gear position. When this takes place, no two control systems are executed at the substantially same time for the switching of the shifting state in the differential portion 11 and the gear shifting of the automatic transmission 20. This provides an ease of performing these operations. The illustrated embodiment, shown in FIG. 14, represents a phase where the engine running area is switched to the motor running area. Thus, during a time period after the time instant $t_3$, the second electric motor M2 is driven to provide torque after the engine 8 has stopped.

As set forth above, the present embodiment has the same effects as those of the illustrated embodiment described above. In addition, if the overlapping phases occur among the operation of the switching control means 50 for the switching of the shifting state, the operation of the engine starting and stopping control means 90 for the starting or the stopping of the engine 8 and the operation of the step variable shifting control means 54 for the gear shifting in the automatic transmission 20, the execution control means 82 executes one of the switching of the shifting means, the starting or the stopping of the engine 8 and the gear shifting of the automatic transmission 20. This suppresses the occurrence of switching shocks that would otherwise occur when the overlapping operations are executed for the switching of the shifting state, the starting or the stopping of the engine 8 and the gear shifting of the automatic transmission 20.

For instance, if the switching of the shifting state, the starting or the stopping of the engine 8 and the gear shifting of the automatic transmission 20 are executed in the overlapping phases, the fluctuations or the like occur in the input torque of the automatic transmission 20 due to the switching of the shifting state and the starting or the stopping of the engine 8. This seems to adversely affect on the operation of the step variable shifting control means 54, which causes the automatic transmission 20 to perform the gear shifting in complicated operation with the resultant occurrence of switching shocks. In a vehicle condition where the motor running area is switched to the engine running area, that is, when a vehicle condition lies at a start-up of the engine, the execution control means 82 takes top priority to execute the starting of the engine 8. Thereafter, the switching of the shifting state is effectuated, upon which the operation is executed to achieve the gear shifting in the automatic transmission 20. This avoids the overlapping operations from being executed for the switching of the shifting state, the starting of the engine 8 and the gear shifting in the automatic transmission 20. In addition, each control is executed in a single step, thereby suppressing the occurrence of switching shocks. In an alternative, the starting of the engine 8 is effectuated in advance, which enables the required drive torque to be rapidly satisfied, providing improved accelerating performance.

Figures 15, 16:
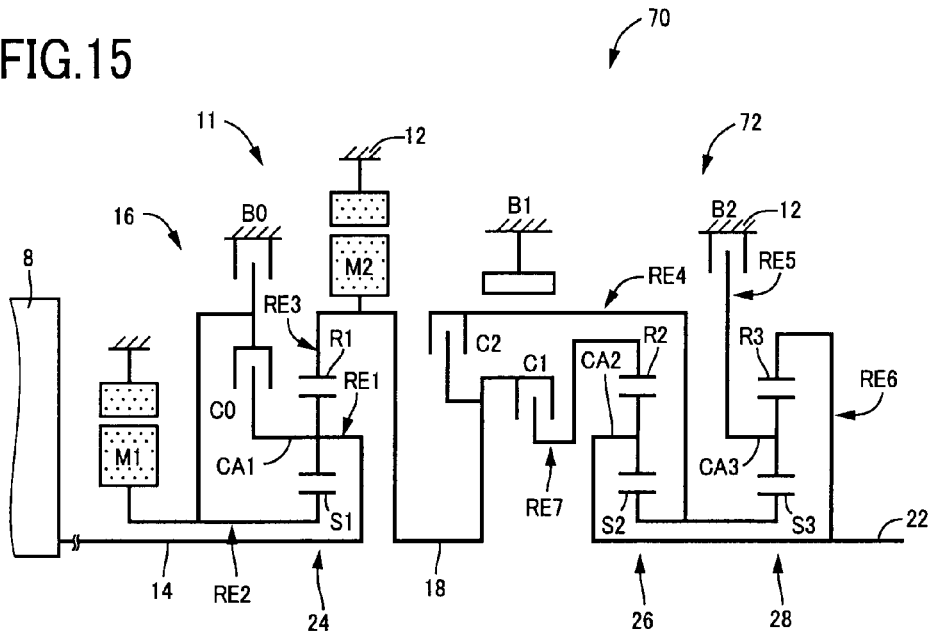
FIG. 15 is a skeleton view explaining a drive apparatus of a hybrid vehicle according to other embodiment of the present invention.
FIG. 16 is an operation Table indicating a relation between a shifting operation of the drive apparatus of the hybrid vehicle of the embodiment shown in FIG. 15 operable in a continuously variable shifting state or a step-variable shifting state, and operation combinations of hydraulic-type frictionally coupling devices used therefor.
Figure 17:
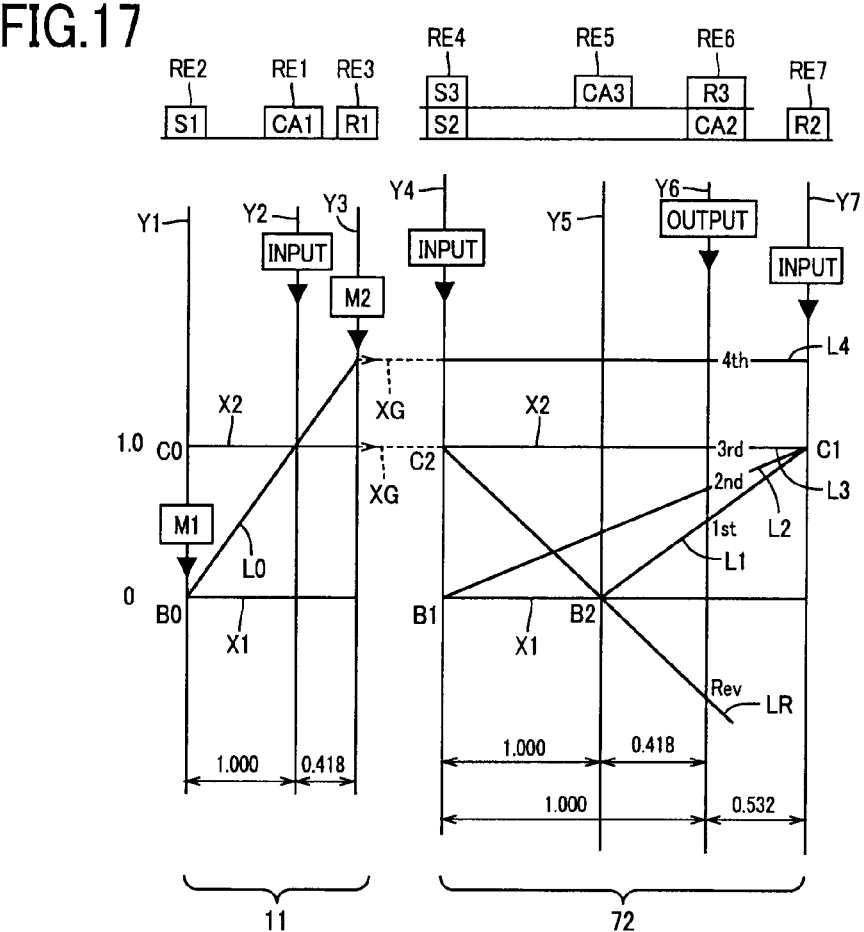
FIG. 17 is a collinear chart showing relative rotating speeds of rotating elements in each of different gear positions when the drive apparatus of the hybrid vehicle of the embodiment shown in FIG. 15 is operated in the step-variable shifting state, corresponding to FIG. 3.

FIG. 15 is a skeleton view explaining structure of a shifting mechanism 70 according to other embodiment of the present invention. FIG. 16 is an operation Table indicating a relation between a shifting position of the shifting mechanism 10, and operation combinations of hydraulic-type frictionally coupling devices used therefor. FIG. 17 is a collinear chart explaining a shifting operation of the shifting mechanism 70.

Like the illustrated embodiment described above, the shifting mechanism 70 comprises the differential portion 11 including the first electric motor M1, the power distributing mechanism 16 and the second electric motor M2, and an automatic transmission 72 with three forward-gear positions connected to the differential portion 11 and the output shaft 22 in series via the transmitting member 18. The power distributing mechanism 16 includes the first planetary gear unit 24 of the single pinion type having a given speed ratio ρ1 of, for instance, about 0.418, the switching clutch C0 and the switching brake B0.

The automatic transmission 72 includes the second planetary gear unit 26 of the single pinion type having a given speed ratio ρ2 of, for instance, about 0.532, and the third planetary gear unit 28 of the single pinion type having a given speed ratio ρ3 of, for instance, about 0.418. The sun gear S2 of the second planetary gear unit 26 and the sun gear S3 of the third planetary gear unit 28 are integrally connected to each other. These sun gears S2 and S3 are selectively coupled to the transmitting member 18 via the second clutch C2 and also selectively coupled to the case 12 via the first brake B1. The second carrier CA2 of the second planetary gear unit 26 and the third ring gear R3 of the third planetary gear unit 28 integrally connected to each other are connected to the output shaft 22. The second ring gear R2 is selectively connected to the transmitting member 18 via the first clutch C1 and the third carrier CA3 is selectively coupled to the case 12 via the second brake B2.

With the shifting mechanism 70 thus constructed, the switching clutch C0, the first clutch C1, the second clutch C2, the switching brake B0, the first brake B1 and the second brake B2 are selectively coupled as shown by, for instance, the operation Table shown in FIG. 16. One of a 1st-gear position (1st-speed position) to a 4th-gear position (4th-speed position), a reverse-gear position (rear-drive position) or a neutral position is selectively established. In this moment, each gear position has a speed ratio γ (=input shaft speed $N_{IN}$/output shaft speed $N_{OUT}$) that substantially varies in equal ratio. In particular, with the present embodiment, the power distributing mechanism 16 incorporates the switching clutch C0 and the switching brake B0. With either the switching clutch C0 or switching brake B0 being coupled, the differential portion 11 can be structured to assume the continuously variable shifting state operative as the continuously variable transmission and, in addition thereto, the fixed shifting state operative as a transmission with a fixed speed ratio.

Accordingly, with either the switching clutch C0 or switching brake B0 brought into coupling engagement, the shifting mechanism 70 can take a structure for the step-variable shifting state operative as the step-variable transmission with the differential portion 11 placed in the fixed shifting state, and the automatic transmission 72. With both the switching clutch C0 and switching brake B0 brought into uncoupling states, the shifting mechanism 70 can take the continuously variable shifting state operative as the electrically controlled continuously variable transmission with the differential portion 11 placed in the continuously variable shifting state, and the automatic transmission 72. In other words, the shifting mechanism 70 is switched to the step-variable shifting state upon coupling either the switching clutch C0 or the switching brake B0, and switched to the continuously variable shifting state upon uncoupling both the switching clutch C0 and switching brake B0.

For the shifting mechanism 70 to function as the step-variable transmission, as shown for instance in FIG. 16, the switching clutch C0, the first clutch C1 and the third brake B3 are coupled, which establishes the 1st-gear position having the highest speed ratio γ1 of, for instance, about 2.804. With the switching clutch C0, the first clutch C1 and the first brake B being coupled, a 2nd-gear position is established with a speed ratio γ2 of, for instance, about 1.531 that is lower than that of the 1st-gear position. With the switching clutch C0, the first clutch C1 and the second clutch C2 being coupled, a 3rd-gear position is established with a speed ratio γ3 of, for instance, about 1.000 that is lower than that of the 2nd-gear position. With the first clutch C1, the second clutch C2 and the switching brake B0 being coupled, a 4th-gear position is established with a speed ratio γ4 of, for instance, about 0.705 that is lower than that of the 3rd-gear position. Further, with the second clutch C2 and the second brake B2 being coupled, a reverse-gear position is established with a speed ratio γR of, for instance, about 2.393 that is intermediate between those of the 1st-gear and 2nd-gear positions. In addition, for the neutral "N" state to be established, for instance, only the switching clutch C0 is coupled.

In contrast, for the shifting mechanism 10 to function as the continuously variable transmission, both the switching clutch C0 and the switching brake B0 are uncoupled as indicated in the operation Table shown in FIG. 16. This allows the differential portion 11 to function as the continuously variable transmission, and the automatic transmission 20 connected to the differential portion 11 in series to function as the step-variable transmission. When this takes place, the rotating speed input to the automatic transmission 72 for the gear positions placed in the 1st-gear, 2nd-gear and 3rd-gear positions, respectively, that is, the rotating speed of the transmitting member 18, is caused to continuously vary. This allows the respective gear positions to have speed ratios in continuously variable ranges. Accordingly, the automatic transmission 72 has a speed ratio that is continuously variable across the adjacent gear positions, causing the shifting mechanism 70 to have the overall speed ratio γT variable in a continuous fashion as a whole.

FIG. 17 shows a collinear chart representing relative relations on the rotating speeds of the rotating elements coupled in differing states for the intended gear positions in the shifting mechanism 70, respectively. The shifting mechanism 70 is structured with the differential portion 11 functioning as the continuously variable shifting portion or first shifting portion, and the automatic transmission 72 functioning as the step-variable shifting portion or a second shifting portion. For the switching clutch C0 and the switching brake B0 to be uncoupled, and for the switching clutch C0 or the switching brake B0 to be coupled, the rotating elements of the power distributing mechanism 16 rotate at the same speeds as those stated above.

In FIG. 17, the automatic transmission 72 operates on four vertical lines Y4, Y5, Y6 and Y7 corresponding to fourth to seventh rotating elements RE4 to RE7 in order from the left, respectively. The fourth rotating element (fourth element) RE4 represents that the second and third sun gears S2 and S3 are connected to each other. The fifth rotating element (fifth element) RE5 corresponds to the third carrier CA3. The sixth rotating element (sixth element) RE6 represents that the second carrier CA2 and the third ring gear R3 are connected to each other. The seventh rotating element (seventh element) RE7 corresponds to the second ring gear R2. Further, in the automatic transmission 72, the fourth rotating element RE4 is selectively connected to the transmitting member 18 via the second clutch C2 and selectively connected to the case 12 via the first brake B1. The fifth rotating element RE5 is selectively connected to the case 12 via the second brake B2. The sixth rotating element RE6 is connected to the output shaft 22 of the automatic transmission 72. The seventh rotating element RE7 is selectively connected to the transmitting member 18 via the first clutch C1.

The automatic transmission 72 operates in a manner as shown in FIG. 17. That is, with both the first clutch C1 and the second brake B2 being coupled, an intersection point between an inclined linear line L1 and the vertical line Y6 represents the rotating speed of the output shaft 22 in the 1st-speed position. The inclined linear line L1 passes across an intersection point between the vertical line Y7 indicative of the rotating speed of the seventh rotating element (seventh element) RE7 (R2), and an intersection point between the vertical line Y5 indicative of the rotating speed of the fifth rotary element RE5 (CA3), and a horizontal line X1. The vertical line Y6 represents the rotating speed of the sixth rotating element (sixth element) RE6 (CA2, R3) connected to the output shaft 22.

Likewise, an intersection point between an inclined linear line L2 determined with both the first clutch C1 and the first brake B1 being coupled, and the vertical line Y6 indicative of the rotating speed of the sixth rotary element RE6 connected to the output shaft 22, represents the rotating speed of the output shaft 22 in the 2nd-speed position. An intersection point between a horizontal linear line L3 determined with both the first clutch C1 and the second clutch C2 being coupled, and the vertical line Y6 indicative of the rotating speed of the sixth rotary element RE6 connected to the output shaft 22, represents the rotating speed of the output shaft 22 in the 3rd-speed position. For the 1st-speed to the 3rd-speed positions, as a result of the switching clutch C0 being coupled, the differential portion 11 inputs drive power to the seventh rotary element RE7 at the same rotating speed as the engine speed $N_E$.

However, as the switching brake B0 is coupled in place of the switching clutch C0, the differential portion 11 inputs drive power to the seventh rotary element RE7 at a rotating speed higher than the engine speed $N_E$. Thus, an intersection point between a horizontal linear line L4 determined with the first clutch C1, the second clutch C2 and the switching brake B0 being coupled, and the vertical line Y6 indicative of the rotating speed of the sixth rotary element RE6 connected to the output shaft 22, represents the rotating speed of the output shaft 22 in the 4th-speed position.

Even with the present embodiment, the shifting mechanism 70 includes the differential portion 11, functioning as the continuously variable transmission or the first shifting portion, and the automatic transmission 72 functioning as the step-variable transmission or the second shifting portion.

This allows the shifting mechanism 70 to have the same advantageous effects as those of the embodiment described above.

FOURTH EMBODIMENT

Figure 18:
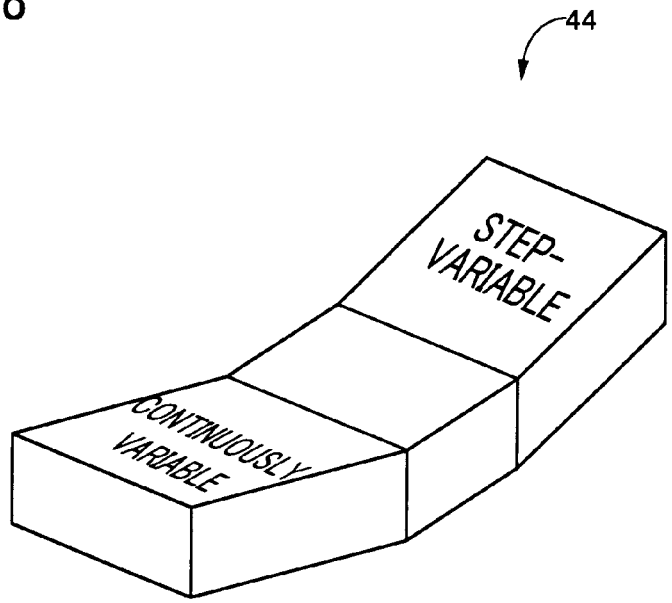
FIG. 18 is a view showing an example of a shifting state manual selection device including a seesaw type switch serving as a switching device to be manipulated by a vehicle driver for selecting a shifting state.

FIG. 18 shows an example a seesaw type switch 44 (hereinafter referred to as a switch 44), acting as a shifting-state manual selection device, which is installed on a vehicle for a vehicle driver to manually operate. The switch 44 allows manual operation to cause the power distributing mechanism 16 to be selectively placed in the differential state and the non-differential state (locked state), that is, the continuously variable shifting state and the step-variable shifting state. The switch 44 allows the vehicle to run in a shifting state desired by the vehicle driver. The switch 44 has a continuously variable shift running command button with a display "CONTINUOUSLY VARIABLE", representing a continuously variable shift running mode, and a step-variable shift running command button with a display "STEP-VARIABLE" representing a step-variable shift running mode. Upon depression of the vehicle driver on one of these buttons, the shifting mechanism 10 can be selectively placed in the continuously variable shifting state, operative as the electrically controlled continuously variable transmission, or the step-variable shifting state operative as the step-variable transmission.

The embodiments set forth above have been described with reference to the case wherein the shifting mechanism 10 performs the automatic switching control operation to be placed in the shifting state based on variations in the vehicle condition by referring to, for instance, the relational chart shown in FIG. 6. On the contrary, in place of the automatic switching control operation or in addition thereto, the switch 44 may be manipulated for thereby executing manual switching control for the shifting state of the shifting mechanism 10. That is, the switching control means 50 may take priority to switch the shifting mechanism 10 to the continuously variable shifting state and the step-variable shifting state depending on the switch 44 selectively operated for the continuously variable shifting state and the step-variable shifting state. For instance, if the vehicle driver, desiring a running mode with a touch of feeling in the continuously variable transmission and improved fuel economy, then manually selects the continuously variable shifting to be placed by the shifting mechanism 10. Further, if another running mode is desired with the step-variable transmission performing the gear shifting accompanied by a rhythmical change in the rotating speed $N_E$ of the engine, the vehicle driver manually selects the step-variable shifting state to be placed by the shifting mechanism 10.

Further, the switch 44 may be configured to have a neutral position in which none of the continuously variable shifting state and the step-variable shifting state is selected. With the switch 44 remaining under the neutral position, that is, when no desired shifting state is selected by the vehicle driver or when a desired shifting state remains in the automatic switching mode, the shifting mechanism 10 may suffice to execute the automatic switching control operation for a particular shifting state.

While the present invention has been described above in detail with reference to the embodiments shown in the accompanying drawings, the present invention may be implemented in other modes. For instance, with the illustrated embodiments described above, if the starting or the stopping of the engine 8 to be executed by the engine starting and stopping control means 90 is under the starting of the engine 8 during the occurrence of the multiplexing phases, the execution control means 82 renders the engine starting and stopping control means 90 to be operative with top priority to perform the starting of the engine 8. However, the execution control means 82 does not necessarily need to have top priority for executing the starting of the engine 8. For instance, the step variable shift control means 54 may be configured to have top priority to allow the automatic transmission 20 to execute the gear shifting (including downshifting). Even with such arrangement, the incidence of the multiplexing phases can be avoided with the resultant suppression of switching shocks and/or the downshifting can be effectuated to immediately satisfy the required drive torque even though a probable degraded response in contrast to a response in the starting of the engine 8.

Furthermore, with the illustrated embodiments stated above, the execution control means 82 executes the sequence control during the occurrence of the multiplexing phases. However, no need arises for all of the controls to be necessarily executed. In an alternative, at least one control can be merely executed so as to interrupt the sequence control from being executed during the occurrence of overlapping phases at the same time, thereby precluding the other controls from being executed. That is, the other controls may be cancelled in operation. For instance, under a circumstance where the accelerator pedal is released by an increased rate in the engine running area under the step-variable shifting state to cause the multiplexing phases to occur, the engine 8 does not necessarily need to be stopped. In such a case, the execution control means 82 may render the switching control means 50 operative to switch the shifting state and/or the step variable shifting control means 54 operative to perform the gear shifting. Thus, no need arises for the engine starting and stopping control means 90 to execute the starting of the engine 8 although the vehicle condition remain in the motor running area. Even with such an operation, the occurrence of multiplexing phases can be avoided, thereby suppressing the switching shocks.

Moreover, with the illustrated embodiments set forth above, the execution control means 82 executes the sequence control to allow the step-variable shift control means 54 to perform the gear shifting of the automatic transmission 20 during the occurrence of the multiplexing phases involving the operation of the step variable shift control means 54 for causing the automatic transmission 20 to execute the gear shifting. However, only the gear shifting of the automatic transmission 20 to be caused by the step variable shift control means 54 may be performed substantially in conjunction with the operation of the switching control means 50 for the switching of the shifting state or the operation of the engine starting and stopping control means 90 for the starting or the stopping of the engine 8.

In addition, the illustrated embodiments have been described above with reference to an exemplary case where for the switching control means 50 to perform the switching of the shifting state during the occurrence of the multiplexing phases, the switching control means 50 makes the determination based on the vehicle condition on the shifting state to be switched by the differential portion 11. However, the present invention may have applications not only to such an automatic switching mode but also to a case where, for instance, the switch 44 is manually operated to cause the shifting state of the differential portion 11 to be manually switched.

Further, the present invention has been described above with reference to another exemplary case where for the step variable shift control means 54 to cause the automatic transmission 20 to perform the gear shifting during the occurrence of the multiplexing phases, the step variable shift control means 54 makes the determination based on the vehicle condition on the gear-shift position to be shifted by the automatic transmission 20. However, the present invention may have applications not only to such an automatic shifting mode but also to a case where the vehicle drive apparatus includes a so-called manual-shift running mode (M-mode) in a controlled pattern with a speed ratio of, for instance, the well known automatic transmission 20 being shifted in manual operation to allow the automatic transmission 20 to be manually shifted in the M-mode.

Further, with the illustrated embodiment shown in FIGS. 12 and 13, torque down may be executed to decrease the input torque applied to the automatic transmission 20. This can be achieved by causing the first electric motor M1 to apply reverse-drive torque or to generate regenerative braking torque in conjunction with the end of operation of the step variable shift control means 54 executed in step S11 for the gear shifting of the transmission 20. This effectively suppresses the occurrence of shifting shocks in the automatic transmission 20 in comparison to those occurring during the operation executed for the torque down of the engine 8 by performing retarding control or throttle control.

Moreover, with the illustrated embodiments mentioned above, the simultaneous switching judge means 80 makes the judgment whether or not the simultaneous switching states occur among the switching of the shifting state, the starting or the stopping of the engine 8 and the gear shifting in the automatic transmission 20. Such a judgment is made based on the determination of the switching control means 50 on the switching of the shifting state, the operation of the engine starting and stopping control means 90 for the determination on the starting of or the determination on the stopping of the engine 8, and the determination of the automatic transmission 20 on the gear shifting. However, the incidence of the simultaneous switching states may be directly judged based on the vehicle condition by referring to, for instance, the map shown in FIG. 6.

Further, the torque assisting effect of the second electric motor M2, effectuated in the phase ranging from the time instants $t_1$ to $t_6$ in FIGS. 10 and 13 described with reference to the embodiment set forth above, may not be necessarily executed.

For instance, in the illustrated embodiment, the shifting mechanism 10, 70 is structured, to enable the differential portion 11 (power distributing mechanism 16) to be switched in the differential state and the non-differential state, for the continuously variable shifting state functioning as the electrically continuously variable transmission and the step-variable shifting state functioning as the step-variable shifting transmission. However, the switching between the continuously variable shifting state and the step-variable shifting state is performed as one mode of placing the differential portion 11 in the differential state and the non-differential state. Even if, for instance, when placed in the differential state, the differential portion 11 may be arranged to function as a step-variable transmission with the shifting speed ratio thereof made variable, not in a continuous mode but in a stepwise mode. In other words, the differential state/non-differential state and the continuously variable shifting state/step-variable shifting state of the shifting mechanism 10, 70 (the power distributing mechanism 16) do not necessarily fall in a one-on-one correspondence, the shifting mechanism 10, 70 needs not necessarily formed in a structure to enable the switching between the step-variable shifting state and the continuously variable shifting state.

In the power distribution mechanisms 16 in the illustrated embodiments, the first carrier CA1 is fixed to the engine 8, and the first sun gear S1 is fixed to the first electric motor M1, and the first ring gear R1 is fixed to the transmitting member 18. However, such connecting arrangement is not essential, and the engine 8, first electric motor M1 and transmitting member 18 are fixed to respective ones of the three elements CA1, S1 and R1 of the first planetary gear set 24.

Although the engine 8 is directly connected to the drive apparatus input shaft 14 in the illustrated embodiments, it may be operatively connected to the input shaft 14 through gears, a belt or the like, and need not be disposed coaxially therewith.

In the illustrated embodiments, the first electric motor M1 and the second electric motor M2 are disposed coaxially with the drive apparatus input shaft 14, the first electric motor M1 is fixed to the first sun gear S1, and the second electric motor M2 is fixed to the transmitting member 18. However, such arrangement is not essential. For example, the first electric motor M1 may be fixed to the first sun gear S1 through gears, a belt or the like, and the second electric motor M2 may be fixed to the transmitting member 18.

Although the power distributing mechanism 16 is provided with both the switching clutch C0 and the switching brake B0, it need not be provided with both of them, and may be provided with only one of the switching clutch C0 and brake B0. Although the switching clutch C0 selectively connects the sun gear S1 and carrier CA1 to each other, it may selectively connect the sun gear S1 and ring gear R1 to each other, or the carrier CA1 and ring gear R1. In essence, the switching clutch C0 sufficiently connects any two of the three elements of the first planetary gear set 24.

The switching clutch C0 in the embodiment is engaged to establish the neutral position "N" in the shifting mechanism 10, 70, but the neutral position need not be established by engagement thereof. The hydraulic-type frictional coupling devices such as the switching clutch C0 and switching brake B0 may be a coupling device of a magnetic-powder type, an electromagnetic type or a mechanical type, such as a powder (magnetic powder) clutch, an electromagnetic clutch and a meshing type dog clutch. The second electric motor M2 connected to the input transmitting member 18 in the illustrated embodiment can be connected to the output shaft 22, or to rotating member disposed in the automatic transmission 20.

In the illustrated embodiment, further, while the step-variable type automatic transmission 20, 72 is disposed in the power transmitting path between the transmitting member 18 serving as the output member of the power distributing mechanism 16 and the drive wheels 38, a power transmitting device of the other type such as, for instance, a continuously variable transmission (CVT) may be provided or may not be necessarily provided. In case of such a continuously variable transmission (CVT), the power distributing mechanism 16 is placed in a fixed speed shifting state and serves in a step-variable shifting state as a whole. The term "step-variable shifting state" used herein refers to a state wherein power transmission is achieved mainly in a mechanical transmitting path without using an electrical path.

In an alternative, the continuously variable transmission may be configured to preliminarily store a plurality of fixed speed ratios in correspondence to gear-shift positions of a step-variable transmission to allow the gear shift to be executed using such a plurality of fixed speed ratios.

In the illustrated embodiment, furthermore, while the automatic transmission 20, 72 is connected to the differential portion 11 in series via the transmitting member 18, a countershaft may be provided in parallel to the input shaft 14 to allow the automatic transmission 20, 72 to be coaxially disposed on an axis of the countershaft. In this case, the differential portion 11 and the automatic transmission 20, 72 are connected to each other in power transmitting capability via a set of transmitting members structured of, for instance, a counter-gear pair acting as the transmitting member, a sprocket and a chain.

Furthermore, the power distributing mechanism 16 in the illustrated embodiment may comprise a differential gear unit wherein, for instance, a pinion drivably rotated with an engine and a pair of bevel gears meshing with the pinion are operatively connected to the first electric motor M1 and the second electric motor M2.

Moreover, while the power distributing mechanism 16 in the illustrated embodiment is composed of one set of planetary gear unit, it may comprise more than two planetary gear units that function as a power transmission with more than three stages in a fixed shifting state.

In addition, while the switch 44 of the illustrated embodiment includes the seesaw type switch, the switch 44 may be of the type, such as a push-button type switch, a two-push-button type switch operative to keep only an alternatively depressed state, a lever type switch, or sliding type switch, etc. It allows at least the continuously variable shift running area (differential state), and the step-variable shift running area (non-differential state) to be alternatively switched. Further, the switch 44 may have a neutral position. With such a configuration, the neutral position may be replaced with an individual switch to be separate from the switch 44. The individual switch makes it possible to validate or invalidate a selected state of the switch 44, that is, an equivalence of the neutral position. Furthermore, in place of the switch 44 or in addition thereto, a device may be provided which allows at least the continuously variable shift running area (differential state) and the step-variable shift running area (non-differential state) to be alternatively switched in response to a driver's voice regardless of the manual operation. In another alternative, it may be possible to employ a device or the like which can be operated with a driver's foot.

Also, the particular arrangement described absolutely represents one illustrative embodiment, and the present invention can be implemented in various modifications and improvements, according to knowledge of the skilled person in this technical field.

What is claimed is:

1. A control device for vehicle drive apparatus,
the vehicle drive apparatus having an engine, a continuously variable transmission including a differential mechanism, through which an output of the engine is distributed to a first electric motor and a transmitting member, and a second electric motor disposed in a power transmitting path between the transmitting member and drive wheels to be operative as an electrically controlled continuously variable transmission, and an automatic transmission forming a part of the power transmitting path and functioning as a shifting mechanism,
the control device comprising:
a differential state switching device provided in the differential mechanism and operative to be selectively switched to an uncoupling state to place the continuously variable transmission in a continuously variable shifting state to render the continuously variable transmission operative as an electrically controlled variable transmission, and to a coupling state to place the continuously variable transmission in a step-variable shifting state to render the continuously variable transmission inoperative as the electrically controlled variable transmission;
switching control means operative to switch the differential state switching device based on a vehicle condition for selectively switching a shifting state of the continuously variable transmission into the continuously variable shifting state and the step-variable shifting state;
engine starting and stopping control means for executing starting and stopping of the engine; and
execution control means for executing either one of the switching of the shifting state and the starting or the stopping of the engine when overlapping phases occur between an operation of the switching control means for switching the shifting state and an operation of the engine starting and stopping control means for executing the starting or the stopping of the engine.

2. The control device for vehicle drive apparatus according to claim 1, wherein the execution control means executes the switching of the shifting state after the starting or the stopping of the engine is executed in advance.

3. The control device for vehicle drive apparatus according to claim 2, further comprising shift control means for causing the automatic transmission to execute a gear shifting, wherein the execution control means executes either one of the switching of the shifting state, the starting or the stopping of the engine and the gear shifting of the automatic transmission when the overlapping phases occur among the switching of the shifting state, the starting or the stopping of the engine and, in addition thereto, the gear shifting of the automatic transmission.

4. The control device for vehicle drive apparatus according claim 3, wherein the execution control means alters an executing sequence based on the vehicle condition.

5. The control device for vehicle drive apparatus according to claim 2, wherein the execution control means alters an executing sequence based on the vehicle condition.

6. The control device for vehicle drive apparatus according to claim 1, further comprising shift control means for causing the automatic transmission to execute a gear shifting, wherein the execution control means executes either one of the switching of the shifting state, the starting or the stopping of the engine and the gear shifting of the automatic transmission when the overlapping phases occur among the switching of the shifting state, the starting or the stopping of the engine and, in addition thereto, the gear shifting of the automatic transmission.

7. The control device for vehicle drive apparatus according to claim 6, wherein the execution control means alters an executing sequence based on the vehicle condition.

8. The control device for vehicle drive apparatus according claim 1, wherein the execution control means alters an executing sequence based on the vehicle condition.

9. A control device for vehicle drive apparatus,
the vehicle drive apparatus having an engine, and a differential portion including a differential mechanism for distributing an output of the engine to a first electric motor and a transmitting member, and a second electric motor disposed in a power transmitting path between the transmitting member and drive wheels,
the control device comprising:
a differential state switching device provided in the differential mechanism for selectively switching the differential mechanism in a differential state for a differential action and a locked state interrupting the differential action;
switching control means operative to switch the differential state switching device based on a vehicle condition for selectively switching a shifting state of the differential mechanism into the differential state and the locked state;

engine starting and stopping control means for executing starting and stopping of the engine; and execution control means for executing either one of the switching of the shifting state and the starting or the stopping of the engine when overlapping phases occur between an operation of the switching control means for the switching of the shifting state and an operation of the engine starting and stopping control means for the starting or the stopping of the engine.

10. The control device for vehicle drive apparatus according to claim 9, wherein the execution control means executes the switching of the shifting state after the starting or the stopping of the engine is executed in advance.

11. The control device for vehicle drive apparatus according to claim 10, further comprising a shifting portion forming a part of the power transmitting path and functioning as a shifting mechanism, and shift control means for causing the shifting portion to execute a gear shifting, wherein the execution control means executes either one of the switching of the shifting state, the starting or the stopping of the engine and the gear shifting of the shifting portion when the overlapping phases occur among the switching of the shifting state, the starting or the stopping of the engine and, in addition thereto, an operation of the shift control means for the gear shifting of the shifting portion.

12. The control device for vehicle drive apparatus according to claim 10, wherein the execution control means alters an executing sequence based on a vehicle condition.

13. The control device for vehicle drive apparatus according to claim 9, further comprising a shifting portion forming a part of the power transmitting path and functioning as a shifting mechanism, and shift control means for causing the shifting portion to execute a gear shifting, wherein the execution control means executes either one of the switching of the shifting state, the starting or the stopping of the engine and the gear shifting of the shifting portion when the overlapping phases occur among the switching of the shifting state, the starting or the stopping of the engine and, in addition thereto, an operation of the shift control means for the gear shifting of the shifting portion.

14. The control device for vehicle drive apparatus according to claim 9, wherein the execution control means alters an executing sequence based on a vehicle condition.

* * * * *